United States Patent
Agarwal et al.

(10) Patent No.: US 11,983,835 B2
(45) Date of Patent: May 14, 2024

(54) PLACING AND MANIPULATING MULTIPLE THREE-DIMENSIONAL (3D) MODELS USING MOBILE AUGMENTED REALITY

(71) Applicant: A9.com, Inc., Palo Alto, CA (US)

(72) Inventors: Mukul Agarwal, San Francisco, CA (US); Jonathan Bernadel-Huey, San Francisco, CA (US); Kevin May, Oakland, CA (US); Xing Zhang, Santa Clara, CA (US); Karl Hillesland, San Carlos, CA (US); Jack Mousseau, Palo Alto, CA (US); Simon Fox, Palo Alto, CA (US)

(73) Assignee: A9.com, Inc., Seattle, WA (US)

( * ) Notice: Subject to any disclaimer, the term of this patent is extended or adjusted under 35 U.S.C. 154(b) by 0 days.

(21) Appl. No.: 18/045,688

(22) Filed: Oct. 11, 2022

(65) Prior Publication Data

US 2023/0054420 A1 Feb. 23, 2023

Related U.S. Application Data

(62) Division of application No. 17/106,669, filed on Nov. 30, 2020, now Pat. No. 11,495,003.

(51) Int. Cl.
*G06T 19/20* (2011.01)
*G06F 3/01* (2006.01)
*G06Q 30/0601* (2023.01)
*G06T 19/00* (2011.01)

(52) U.S. Cl.
CPC .............. *G06T 19/20* (2013.01); *G06F 3/016* (2013.01); *G06Q 30/0643* (2013.01); *G06T 19/006* (2013.01); *G06T 2210/12* (2013.01); *G06T 2210/21* (2013.01)

(58) Field of Classification Search
CPC ... G06T 19/20; G06T 19/006; G06T 2210/12; G06T 2210/21; G06F 3/016; G06F 3/011; G06F 3/0346; G06Q 30/0643
See application file for complete search history.

(56) References Cited

U.S. PATENT DOCUMENTS

| | | | |
|---|---|---|---|
| 2017/0345197 A1* | 11/2017 | Sakai | G06T 11/60 |
| 2021/0125414 A1* | 4/2021 | Berkebile | G06F 3/017 |
| 2021/0165932 A1* | 6/2021 | Mohan | G06F 11/3476 |
| 2023/0153486 A1* | 5/2023 | Ohnuki | B25J 9/1666 703/7 |

\* cited by examiner

*Primary Examiner* — Chong Wu
(74) *Attorney, Agent, or Firm* — Kilpatrick Townsend & Stockton LLP

(57) ABSTRACT

Techniques for placing and manipulating multiple three-dimensional (3D) models using mobile augmented reality (AR) are described. One technique includes receiving a first request to initialize an AR simulation of a first product for sale within a physical environment. In response to the first request, a first 3D model of the first product for sale is rendered onto the screen. After rendering the first 3D model, a second request to visualize a second product for sale within the physical environment is received during the AR simulation of the first product for sale. In response to the second request, a second 3D model of the second product for sale is rendered onto the screen with the first 3D model.

20 Claims, 26 Drawing Sheets

US 11,983,835 B2

PLACING AND MANIPULATING MULTIPLE THREE-DIMENSIONAL (3D) MODELS USING MOBILE AUGMENTED REALITY

CROSS-REFERENCE TO RELATED APPLICATION

This application is a divisional of U.S. patent application Ser. No. 17/106,669, filed on Nov. 30, 2020, issued as U.S. Pat. No. 11,495,003 on Nov. 8, 2022, and titled "PLACING AND MANIPULATING MULTIPLE THREE-DIMENSIONAL f3D) MODELS USING MOBILE AUGMENTED REALITY". The aforementioned related patent application is herein incorporated by reference in its entirety.

BACKGROUND

The present invention relates to augmented reality (AR), and more specifically, to techniques for manipulating multiple virtual objects in AR on a computing device.

AR involves superimposing computer generated imagery on a user's view of the real-world environment. An AR system can use a video device to display a series of images (or video feed) of the real-world environment to a user, where the images have various virtual objects inserted into appropriate places in the environment. For example, the AR system can identify a real-world object of a table, so that a virtual object of a cup may be displayed on the video device as appearing on the table (e.g., from the perspective of the video device). AR can be used for shopping, navigational purposes, games, construction/architectural projects, educational purposes, and the like.

BRIEF DESCRIPTION OF DRAWINGS

Various embodiments in accordance with the present disclosure will be described with reference to the drawings, where like designations denote like elements. Note that the appended drawings illustrate typical embodiments and are therefore not to be considered limiting; other equally effective embodiments are contemplated.

DETAILED DESCRIPTION

Figure 1A:
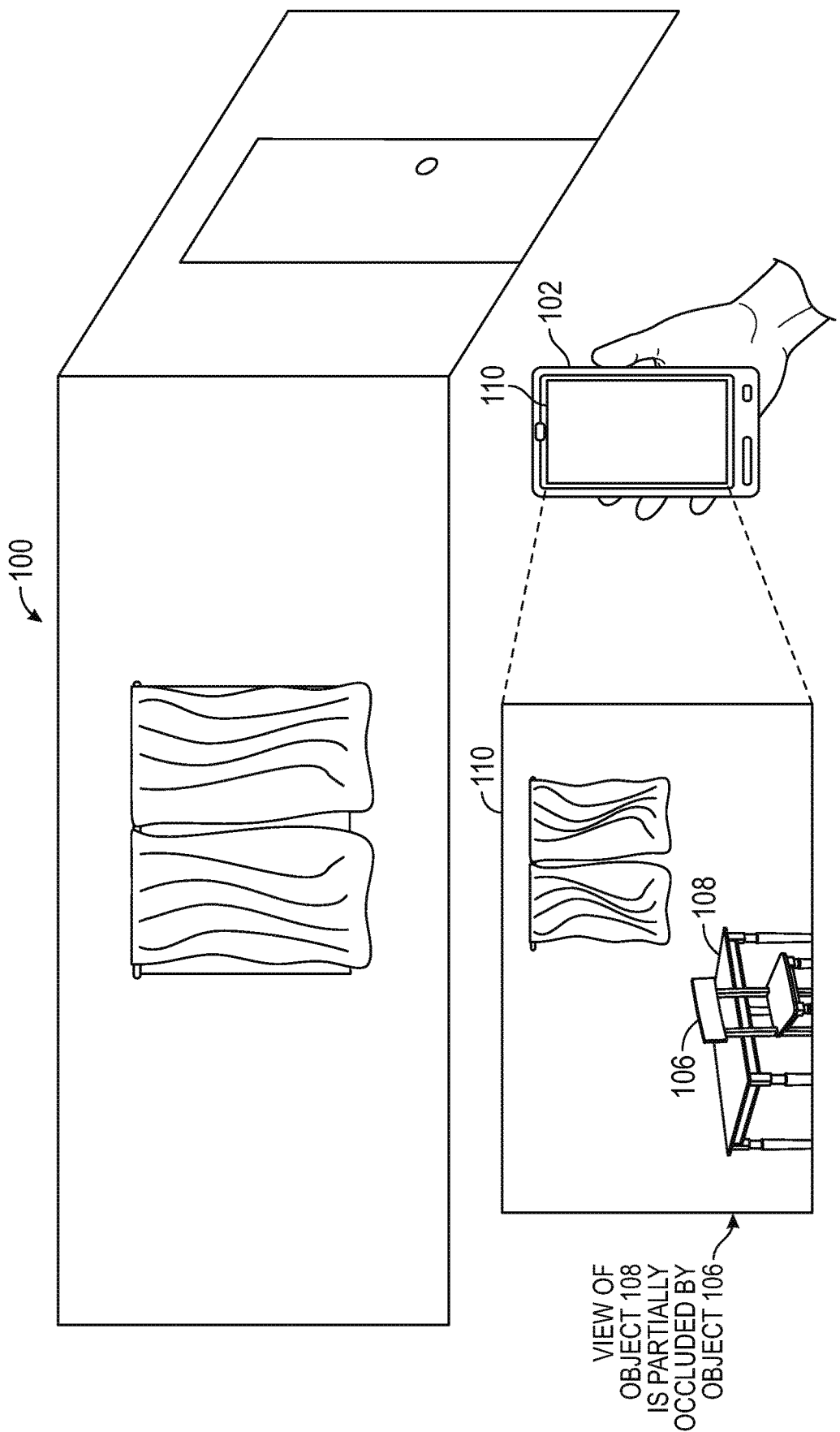
FIG. 1A illustrates an example scenario of visualizing virtual objects in a physical environment with a computing device.

Some retail software applications include AR functionality that allows users to virtually interact with various items (e.g., products for sale) in a physical (or real-world) environment. Users can use the AR functionality to preview what a given item would look like in the physical environment prior to purchasing the item. For example, the AR functionality may allow a user to determine whether a furniture item will fit in (or is the right size for) a living room, determine how a rug fits and looks next to a couch in a living room, mix and match different attributes (e.g., color, size, etc.) of an item with other physical objects in a room, and the like.

One issue with conventional AR functionality in software applications is that the AR functionality generally does not allow a user to evaluate and interact with multiple virtual items (or objects) at the same time within the physical environment. For example, conventional AR functionality may allow the user to place and interact with a single virtual item at a time during an AR simulation. This limited AR functionality can lead to a negative user experience, which can cause users to abandon the AR feature and/or the software application. For example, the user may not be able to evaluate items of different sizes and configurations at the same time within the physical environment to determine which of the items best fits within the physical environment. Additionally, the user may not be able to evaluate combinations of items (e.g., complementary products, such as a table with four chairs, a sofa/couch and coffee table, etc.) within the physical environment to determine whether to purchase the item combination(s).

Embodiments described herein provide techniques that enable a user to place and interact with multiple virtual objects within the same AR simulation. More specifically, an AR feature on a computing device can enable a user to preview what multiple items would look like in a physical environment. In one reference example, the user can browse (or search) for a particular category of items (e.g., dining room furniture) using a retail software application on a computing device, and select to view more information regarding a particular item (e.g., table) from the category of items. The user may be shown a product detail page for an item (e.g., table) on a screen of the computing device. The product detail page may include various information related to the item, including, for example, product reviews, product description, visual appearance of the item, price, rating, product (object) identifier (ID), etc.

The product detail page may provide the user with the option to virtually interact with the item in a physical environment. For example, the user may select a button prompt (e.g., "View in Room") presented on the computing device's screen to enable an AR feature (or AR simulation) that allows the user to preview what the item would look like in the physical environment. Once selected, the AR feature can render a three-dimensional (3D) model (e.g., virtual object) of the item on the computing device's screen. Additionally, as described below, the AR feature may present another "add" prompt that allows the user to preview additional item(s) in the physical environment along with the initial item. For example, once the "add" prompt is selected, the AR feature may display a set of additional items (e.g., chair, buffet table, rug, etc.). The additional items may be associated with the initial item, with other item(s) being previewed in the AR simulation, or a combination thereof. The user can browse the set of additional items and select to preview one of the additional items (e.g., chair). The AR feature can then render a 3D model of the additional item on the computing device's screen, allowing the user to interact with both items in the physical environment, via the computing device.

In some cases, interacting with multiple virtual objects within an AR simulation can cause user confusion. For example, when interacting within the AR simulation, the user can move or manipulate a virtual object in a manner such that it collides with another virtual object(s) and/or becomes occluded by another virtual object(s). In these instances, the user may lose track of one or more of the virtual objects during the AR simulation. FIG. 1A, for example, illustrates a reference scenario in which interacting with multiple virtual objects in a physical environment 100 can lead to a negative (or poor) user experience. Here, the user can enable an AR feature of a retail software application on a computing device 102 to visualize virtual object 106 (e.g., 3D model of a chair) and virtual object 108 (e.g., 3D model of a table) on the screen 110 of the computing device 102. The user may select virtual object 106 on the screen 110 in order to manipulate the virtual object 106 (e.g., change orientation of the virtual object, rotate the virtual object, change placement or position of the virtual object, etc.).

As shown in FIG. 1A, however, when manipulating the virtual object 106, the user moves the virtual object 106 to a position where it partially occludes the virtual object 108. For example, the virtual object 106 may be moved to a position in the physical environment that when projected onto the screen 110 occludes at least a portion of the virtual object 108 on the screen 110. This occlusion of the virtual object 108 can cause user confusion. For example, because users may be unfamiliar with AR functionality, the user may not know the reason why the user can only see a partial view of the virtual object 108, may lose track of virtual object 108, etc. Consequently, this AR functionality can cause users to abandon the AR feature and/or the software application.

Figure 1B:
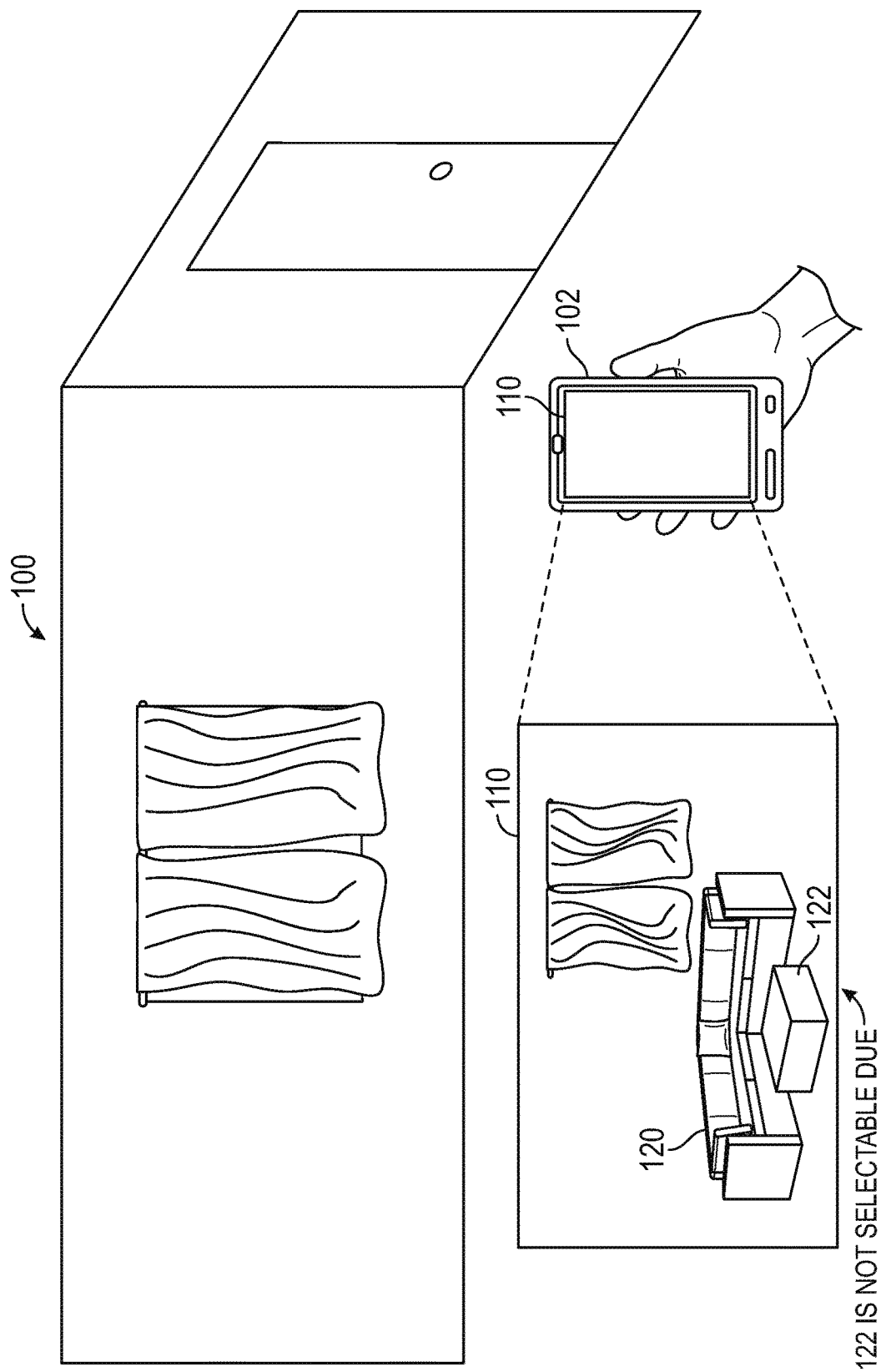
FIG. 1B illustrates another example scenario of visualizing virtual objects in a physical environment with a computing device.

FIG. 1B illustrates another reference scenario in which interacting with multiple virtual objects in a physical environment 100 can lead to a negative (or poor) user experience. Here, the user can enable an AR feature of a retail software application on the computing device 102 to visualize virtual object 120 (e.g., 3D model of a sofa) and virtual object 122 (e.g., 3D model of a coffee table/ottoman) on the screen 110 of the computing device 102. The user may select virtual object 122 on the screen 110 in order to manipulate the virtual object 122. Here, in particular, the virtual object 122 is moved to a position in front of the virtual object 120. However, when placed at this position, the virtual object 122 will fully collide with the virtual object 120. That is, a transparent bounding box of the virtual object 122 (not visible on the screen 110) is fully placed within the transparent bounding box of the virtual object 120. As described below, the bounding box of a particular virtual object may have the smallest set of dimensions that completely contains the virtual object.

In this instance, while it may appear to the user that the virtual object 122 is being placed in empty space in front of the virtual object 120, the user is actually placing the virtual object 122 in empty space that is within the bounding box of the virtual object 120. This placement can lead to a situation where the user is not able to re-select the virtual object 122. Because the user may not be familiar with AR functionality, the user may not know the reason why virtual object 122 cannot be re-selected and/or how to avoid this situation. Consequently, this AR functionality can also cause users to abandon the AR feature and/or the software application.

Embodiments described herein provide techniques that can improve user experience when interacting with multiple virtual objects during an AR simulation on a computing device. As described below, embodiments can provide feedback to users when virtual objects collide during an AR simulation. The feedback can include visual feedback and/or multi-modal (e.g., haptic) feedback. For example, embodiments can render (or display) on the computing device's screen a bounding box of the (static) virtual object that is collided by the (active) selected virtual object during the AR simulation. Additionally or alternatively, embodiments can generate multi-modal feedback (e.g., a vibration) via a haptic device on the computing device to indicate to the user when a collision occurs.

Additionally or alternatively, embodiments can provide an indication to users when virtual object(s) become occluded by other virtual object(s) during the AR simulation. In one embodiment described below, embodiments can render a modified representation of the virtual object (e.g., altering one or more attributes, such as shading, color, transparency, size, highlighting, opacity, etc.) when the virtual object becomes partially or fully occluded by another virtual object during the AR simulation. In this manner, embodiments can significantly enhance user experience with AR features in software applications.

Note that certain embodiments are described herein using a retail software application for various household items (e.g., furniture) as an example of computer software that can provide improved visualizations of such items in a physical environment. In other embodiments, the techniques presented herein may be used for visualization of a wide variety of items (e.g., clothing, groceries, books, electronics, etc.) and can be used by a broad variety of retailers (e.g., discount stores, department stores, etc.). As used herein, a physical object (or item or product) may also be referred to as real-world object (or item or product). Similarly, as used herein, a virtual object (or item) may be referred to as a 3D model (of a physical object), an AR object, a virtual representation (of a physical object), etc.

Figure 2:
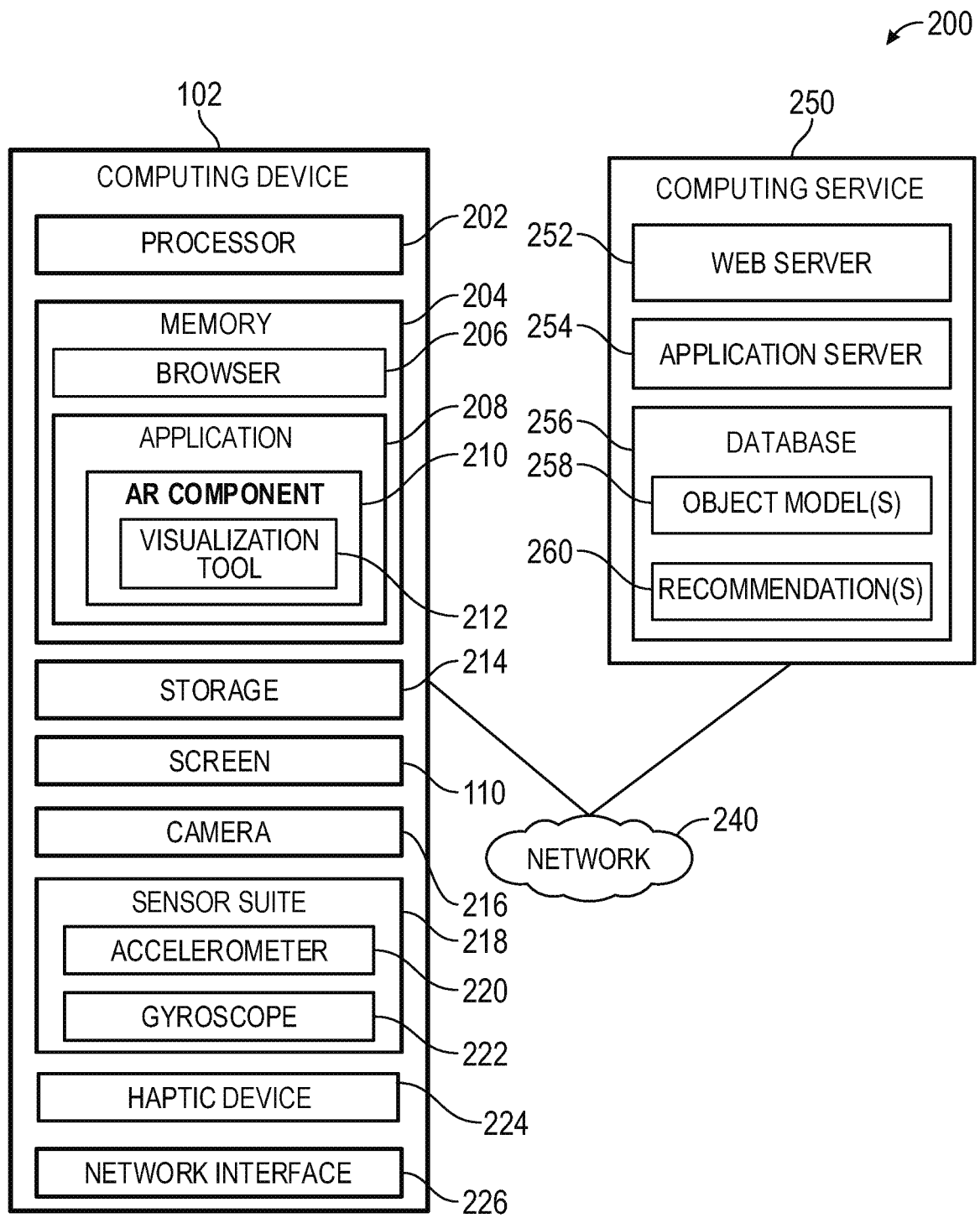
FIG. 2 illustrates an example of a computing environment used to provide AR features for a retail software application, according to one embodiment.

FIG. 2 illustrates an example of a computing environment 200 used to provide AR features for a retail software application, according to one embodiment. As shown, the computing environment 200 includes a computing device 102 and a computing service 250, which are interconnected via a network 240. The network 240, in general, may be a wide area network (WAN), a local area network (LAN), a wireless LAN, a personal area network (PAN), a cellular network, etc. In a particular embodiment, the network 240 is the Internet.

Computing device 102 is generally representative of a mobile (or handheld) computing device, including, for example, a smartphone, a tablet, a laptop computer, etc. Here, the computing device 102 includes a processor 202, a memory 204, storage 214, a screen 110, a camera 216, a sensor suite 218, a haptic device 224, and a network interface 226. The processor 202 represents any number of processing elements, which can include any number of processing cores. The memory 204 can include volatile memory, non-volatile memory, and combinations thereof.

The memory 204 generally includes program code for performing various functions related to applications (e.g., applications 208, browser(s) 206, etc.) hosted on the computing device 102. The program code is generally described as various functional "applications" or "modules" within the memory 204, although alternate implementations may have different functions or combinations of functions. Here, the memory 204 includes a browser 206 and an application 208, which includes an AR component (or application or module) 210. The AR component 210 is generally configured to provide one or more AR effects to a user, e.g., for the application 208, browser 206, etc. Note, the AR component 210 is described in more detail below.

The storage 214 may be a disk drive storage device. Although shown as a single unit, the storage 214 may be a combination of fixed and/or removable storage devices, such as fixed disc drives, removable memory cards, or optical storage, network attached storage (NAS), or a storage area-network (SAN). The network interface 226 may be any type of network communications interface that allows the computing device 102 to communicate with other computers and/or components in the computing environment 200 via a data communications network (e.g., network 240).

The screen 110 (also referred to as a display) and camera 216 (also referred to as video device) allow the user to view the physical environment (e.g., physical environment 100) where the computing device is located, from the perspective of the computing device 102. For example, the camera 216 can capture a series of images (or a video feed) of the physical environment, and the video feed can be shown on the screen 110 of the computing device 102. As described below, the camera 216 may be activated to provide (to the screen 110) a video feed over which virtual objects may be overlaid or into which virtual objects may be inserted. In this case, the screen 110 may allow the user to view the environment into which virtual objects are inserted. The screen 110 may include a Liquid Crystal Display (LCD), Light Emitting Diode (LED), or other display technology. In one embodiment, the screen 110 includes a touch-screen interface. In one embodiment, the camera 216 is provided in conjunction with image recognition software (e.g., stored in memory 204) to identify physical objects in the field of view of the camera 216.

The sensor suite 218 includes one or more sensors that are configured to sense information from the physical environment. In this embodiment, the sensor suite 218 includes an accelerometer 220 and a gyroscope 222. The accelerometer 220 measures acceleration forces acting on the computing device 102 and may provide information as to whether the computing device 102 is moving, and in which direction(s). In one embodiment, the accelerometer 220 can be used to determine a tilt of the computing device 102. The gyroscope 222 can measure orientation of the computing device 102, and provide information as to whether the computing device 102 is level or to what degree the computing device 102 is tilted in one or more planes. In one embodiment, the combination of the accelerometer 220 and the gyroscope 222 may provide information of a direction sense for the computing device 102 in terms of pitch and roll with respect to gravity. In general, the computing device 102 may include any number of sensors and/or utilize any technique or combination of techniques, suitable with the functionality described herein, to determine an orientation (e.g., tilt) of the computing device 102.

Note that the sensor suite 218 can include various types of sensors and is not limited to the accelerometer 220 and the gyroscope 222. Other types of sensors that can be included in the sensor suite 218 include, but are not limited to, a Global Positioning System (GPS) receiver, inertial motion units (IMUs), or any type of sensor that provides information regarding a position and/or location of the computing device 102 in a physical environment.

The haptic device 224 is generally configured to generate (or create) force, vibration, and motion sensations. For example, the haptic device 224 can generate a vibration (or force feedback) to provide an alert to the user. As described below, in one embodiment, the haptic device 224 can be triggered to generate a vibration each a collision is detected during an AR simulation. The haptic device 224 can be implemented with a variety of technologies, including, but not limited to, eccentric rotating mass vibration (ERMV) motors, linear resonant actuators (LRAs), piezo haptic sensors, etc.

The computing device 102 is generally configured to host applications used to access the computing service 250. For example, the computing device 102 includes a web browser 206 (within memory 204) used to access the computing service 250 by rendering web pages received from the computing service 250. The computing device 102 also includes an application 208 (within memory 204), which is representative of a component of a client server application (or other distributed application) which can communicate with the computing service 250 over the network 240. Application 208 may be a "thin" client where the processing is largely directed by the application 208, but performed by computing systems of the computing service 250, or a conventional software application installed on the computing device 102.

The computing device 102 may access the computing service 250 over the network 240 using the browser 206 and/or the application 208. For example, in the case where the computing service 250 provides a retail software application, the browser 206 and the application 208 may provide software which allows a user to browse through a given retailer's inventory and select item(s) for purchase. The software application may also provide other features, such as the ability to post questions and answers about various items using an online community, provide feedback about various items to the software application, etc.

As shown, the computing service 250 includes a web server 252, an application server 254, and a database 256. In this example, the computing service 250 is generally modeled as a service back-end (e.g., web server 252, application server 254, and a database 256). Of course, other software architectures or distributed application frameworks could be used. Web server 252 and application server 254 are representative of physical computing systems, as well as representative of virtual machine instances deployed to a computing cloud. Similarly, the database 256 can be located on a single computing system or distributed across multiple computing systems. The web server 252 may communicate with the application server 254 to respond to requests from applications on the computing device 102.

The application server 254 may respond to requests from computing devices by generating hypertext markup language (HTML) and related content passed to computing devices (via the web server 252) and rendered as a user interface (e.g., pages, including forms, windows, text fields, and so on, along with scripts or applets or widgets executed by a web browser). In some cases, the application 208 could generate information (or application) content to present data retrieved from the application server 254. In general, the application server 254 may be implemented using any suitable software programming language, application framework, web service solution stack, virtual application containers, etc., in order to present application features and content to a computing device.

In some cases, the application server 254 may include graphical user interface (GUI) components that can be presented on the computing device 102, e.g., for allowing a user to search for information content (e.g., browse items for purchase). The GUI components may include, for example, HTML components or code that generates HTML components that can be passed to the computing device 102 and rendered as a user interface. The GUI components may additionally include instructions executable by the computing device 102 to display a user interface using language-specific or operating system-specific GUI components (e.g., Abstract Window Toolkit, Swing API components on the Java platform, and so on). Generally, instructions capable of rendering a GUI on the computing device 102 may include computer executable code generated from compiling and/or interpreting C (or variants thereof), Java, PHP, Ruby, HTML, javascript, Python, AJAX, VBscript, and other programming or scripting languages used to compose and present a GUI. In an example retail software application, the application server 254 components may include pages that display product detail information and that allow users to select items for purchase. In some embodiments, the application server 254 components can include prompts (e.g., icons, text, buttons, etc.) that allow the user to trigger an AR feature (e.g., AR component 210) of the application.

The AR component 210 generally allows a user to visualize and virtually interact with one or more items (e.g., products for sale) on the application 208 in a physical environment. Once triggered via the application 208 and/or the browser 206, the AR component 210 may activate the camera 216 and sensor suite 218 to present (or display) a video feed of the physical environment on the screen 110 of the computing device 102. The AR component 210 can retrieve a virtual object corresponding to the item from the database 256. The database 256, for example, includes object models 258 (e.g., 3D models) for various items that may be in inventory and available for purchase on the application 208.

In some embodiments, the AR component 210 can provide a set of recommendation(s) for a virtual object that is rendered on the screen 110. For example, assuming the user is visualizing a table in a physical environment, the AR component 210 can provide information regarding another set of items (e.g., recommendations 260) associated with the table. The recommendations 260 may include other items that have been frequently bought with the item, other items in an item set that includes the table, items that the user has previously saved in a wishlist, item categories, etc. In one embodiment, the set of recommendations 260 for each virtual object (e.g., object model 258) may be generated via machine learning techniques and stored in the database 256. If the user chooses to visualize one of the recommended items, the AR component 210 can obtain the virtual object (e.g., object model 258) for the recommended item and render the virtual object along with the initial virtual object on the screen 110.

The AR component 210 can detect a planar surface (e.g., ground, table, etc.) within the physical environment using the camera 216. For example, the camera 216 can capture one or more images (or video frames) of the physical environment and the AR component 210 can determine a 3D geometry of the space, based on the captured image(s). The AR component 210 can use a variety of computer vision techniques (e.g., scale-invariant feature transform (SIFT)) and/or software development kits (SDKs) (e.g., ARKit, ARCore, Wikitude, etc.) to detect plane geometry (e.g., a horizontal plane) within the physical environment based on the captured images. For example, using one or more of these tools, the AR component 210 can process each image and extract a set of feature points (e.g., an edge of an object, corner of an object, center of an object, etc.) for each image (e.g., using SIFT). The AR component 210 can track the features across multiple images (or frames) as the computing device 102 moves (e.g., the AR component 210 may prompt the user to scan the floor with the computing device 102). During this tracking, the AR component 210 can estimate 3D pose information (e.g., current camera position and the positions of the features).

Once the AR component 210 determines that a sufficient number of feature points have been extracted (e.g., above a threshold), the AR component 210 can fit planes to the feature points and find the best match in terms of scale, orientation, and position. In some embodiments, the AR component 210 may render the detected plane onto the screen 110 of the computing device 102. For example, the AR component 210 may render a virtual grid onto the screen 110, representative of the detected plane. The AR component 210 may continually update the detected plane (e.g., based on feature extraction and plane fitting), as the computing device 102 moves. In this manner, the AR component 210 can identify planes for various surfaces (e.g., floor, table, couch, windowsill, etc.) in the physical environment.

The AR component 210 can perform ray casting (e.g., using one or more of the above tools) to determine (or identify) positions on the plane. Using ray casting, the AR component 210 can take a position in screen space (e.g., a two-dimensional point (2D) point (or location) on the screen 110) and provide a 3D vector (e.g., based on one or more attributes of the camera 216, such as focal length) for the 2D screen location. In some examples, the 2D screen location may be determined based on a user's touch on the screen 110. The AR component 210 can project (or cast) the 3D vector (outward from the screen 110) onto the plane to determine the 3D location (or position) where the 3D vector intersects the plane.

The AR component 210 can use the intersection point as a (target) placement position for a virtual object that is overlaid into the video feed provided on the screen 110. In some cases, the AR component 210 can perform ray casting using a center position in the screen space (e.g., center point on the screen 110) as the starting 2D screen location for the 3D vector. In one embodiment, the AR component 210 can perform ray casting using a position in the screen space determined from a user's touch on the screen (e.g., the user may touch a virtual object on the screen to manipulate the object).

Once the object model 258 of an item is retrieved (e.g., downloaded), the AR component 210 can render (e.g., by overlaying or inserting) the object model 258 into the video feed of the physical environment (shown on the screen 110). Once a position of the virtual object is fixed or anchored, the AR component 210 can allow the user to interact with the virtual object, e.g., by using the computing device 102 to view how the virtual object looks in the physical environment from different vantage points. In some embodiments, the AR component 210 can use ray casting to provide a 3D location in physical space corresponding to a user's touch on the screen 110, where the 3D location corresponding to the user's touch is an anchor point for the virtual object overlaid into the video feed provided on the screen 110.

As shown, the AR component 210 includes a visualization tool 212, which is configured to perform one or more techniques described herein. The visualization tool 212 can include software, hardware, or combinations thereof. In one embodiment, the visualization tool 212 is configured to provide feedback to a user when one or more virtual objects collide during an AR simulation. The feedback, e.g., can include visual feedback, multi-modal feedback, or combinations thereof. Additionally or alternatively, the visualization tool 212 can indicate to a user when a virtual object is occluded by one or more virtual objects during an AR simulation. In this manner, the visualization tool 212 can significantly enhance user experience with AR features used to preview item on the application 208.

Note that FIG. 2 illustrates a reference example of a computing environment 200 in which the techniques presented herein can be implemented and that the techniques presented herein can be implemented in other computing environments. For example, in some embodiments, the computing environment 200 may include an AR system having an AR headset that provides a screen/display, camera, and/or one or more sensors. The AR headset may be a headset worn by the user, examples of which can include a head mounted display (HMD), eye-glasses, AR glasses, AR visor, helmet, etc. In some embodiments, the AR headset may be a standalone system. That is, the AR headset may include components (e.g., processor, memory, AR component 210, sensor suite 218, etc.) used to implement the techniques described herein. In some embodiments, the AR headset may be separate from the user's computing device. In these embodiments, the AR headset may be communicatively coupled to the computing device (e.g., via wireless and/or wired communications) and may exchange information with the AR component 210 on the computing device in order to implement the techniques described herein.

Figure 3:
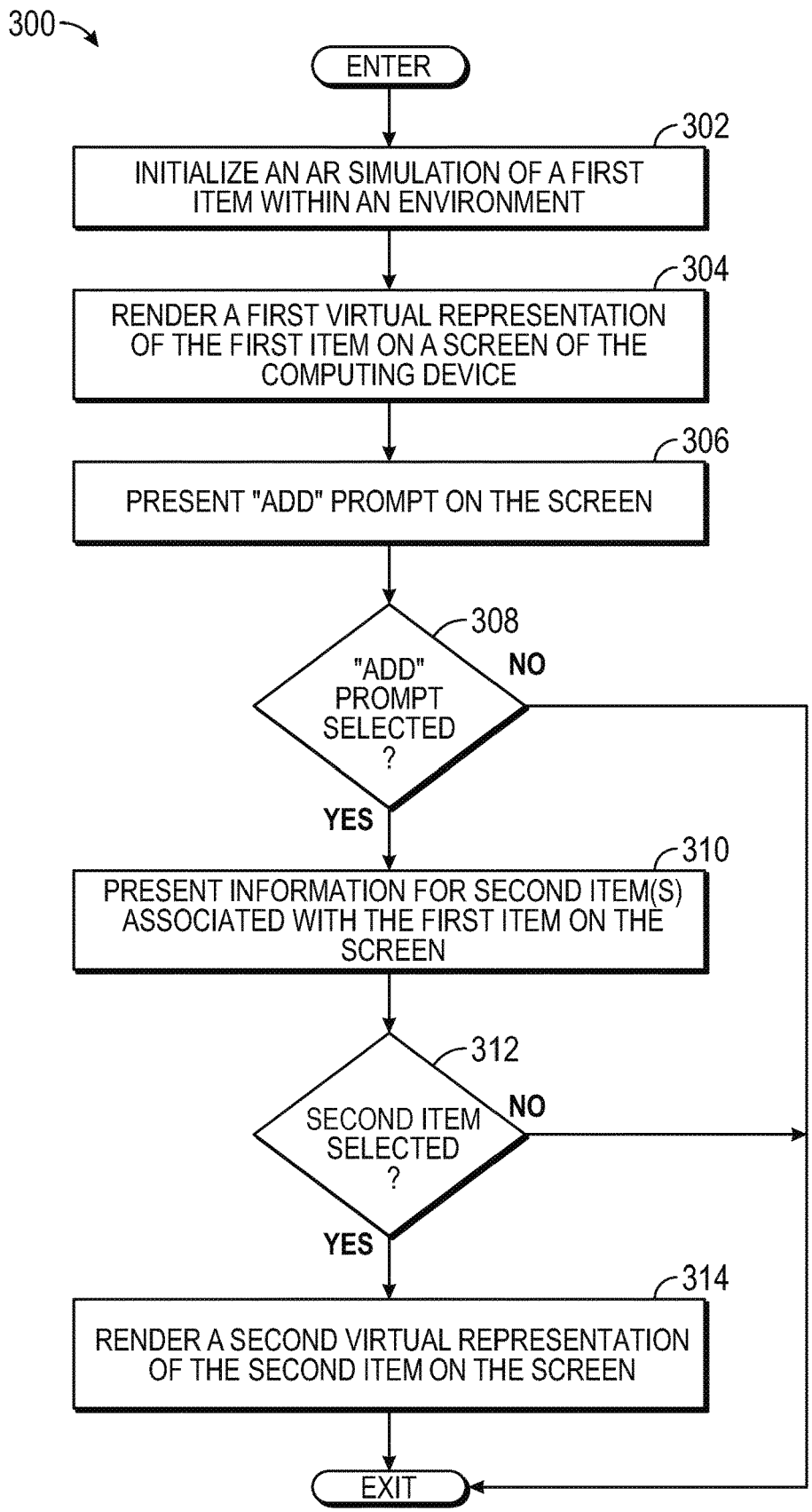
FIG. 3 is a flowchart of a method for visualizing multiple virtual objects on a computing device, according to one embodiment.

FIG. 3 is a flowchart of a method 300 for visualizing multiple virtual objects on a computing device, according to one embodiment. The method 300 may be performed by an AR component (e.g., AR component 210) and/or one or more components of a computing device (e.g., computing device 102).

Figure 4A:
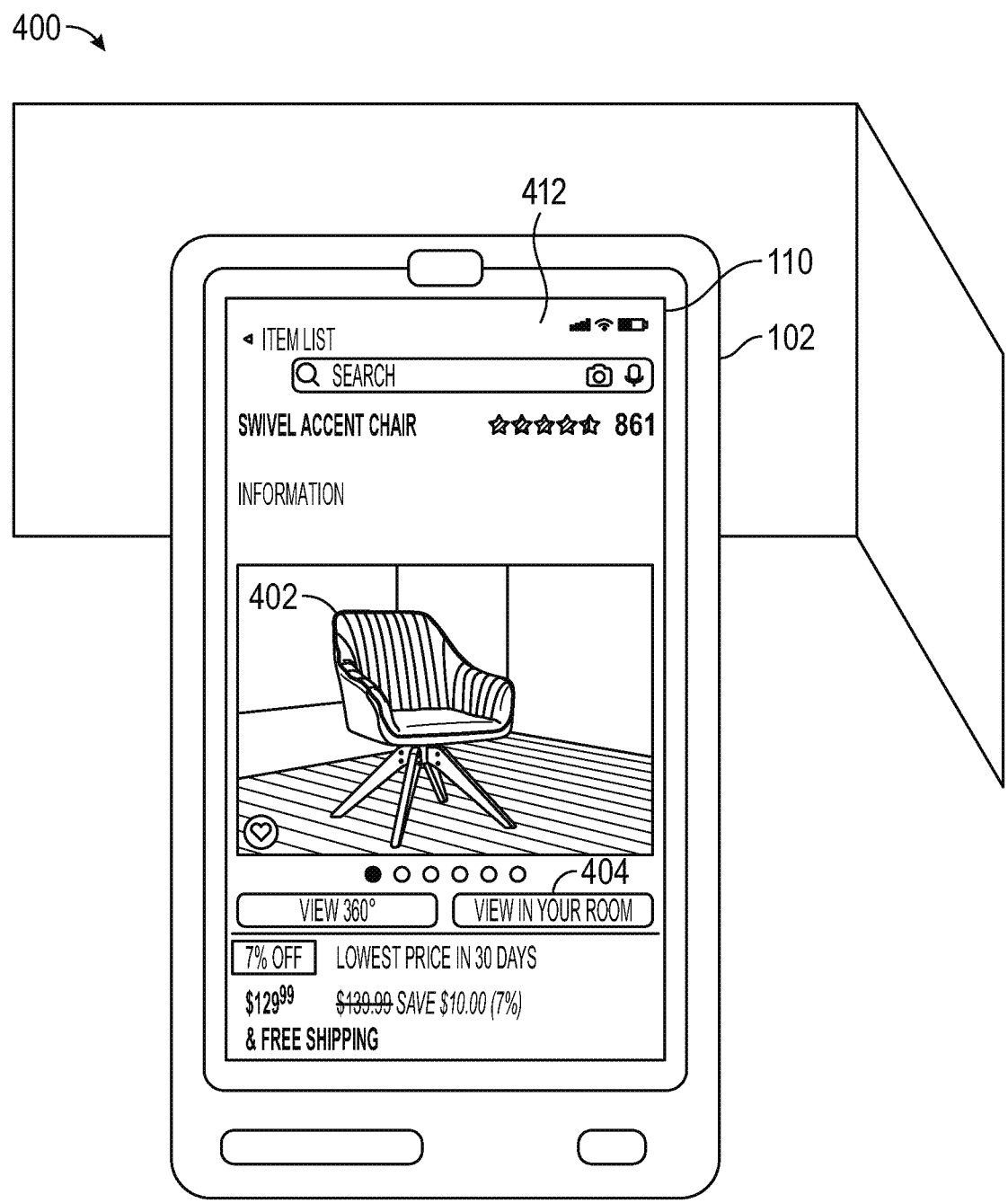
FIGS. 4A-4D illustrate an example scenario of visualizing multiple virtual objects on a computing device, according to one embodiment.

The method 300 enters at block 302, where the AR component initializes an AR simulation of a first item within an environment (e.g., physical environment 100). The item may be a product for sale that the user has identified and selected while browsing (or searching for) items on the application (e.g., application 208) and/or via a web browser (e.g., browser 206). As shown in FIG. 4A, for example, the user is shown a product detail page 412 for an item 402 (e.g., swivel chair) on screen 110 of the computing device 102. The product detail page 412 includes various information related to the item 402 (e.g., product reviews, ratings, price, product description, visual appearance of the item, etc.). The product detail page 412 provides a button prompt 404 ("View in Your Room"), which allows the user to preview how the item 402 would look in the physical environment 400 and/or virtually interact with the item 402 in the physical environment 400. In one embodiment, the selection of button prompt 404 triggers the initialization of the AR simulation of the item 402 in the physical environment 400.

Figure 4B:
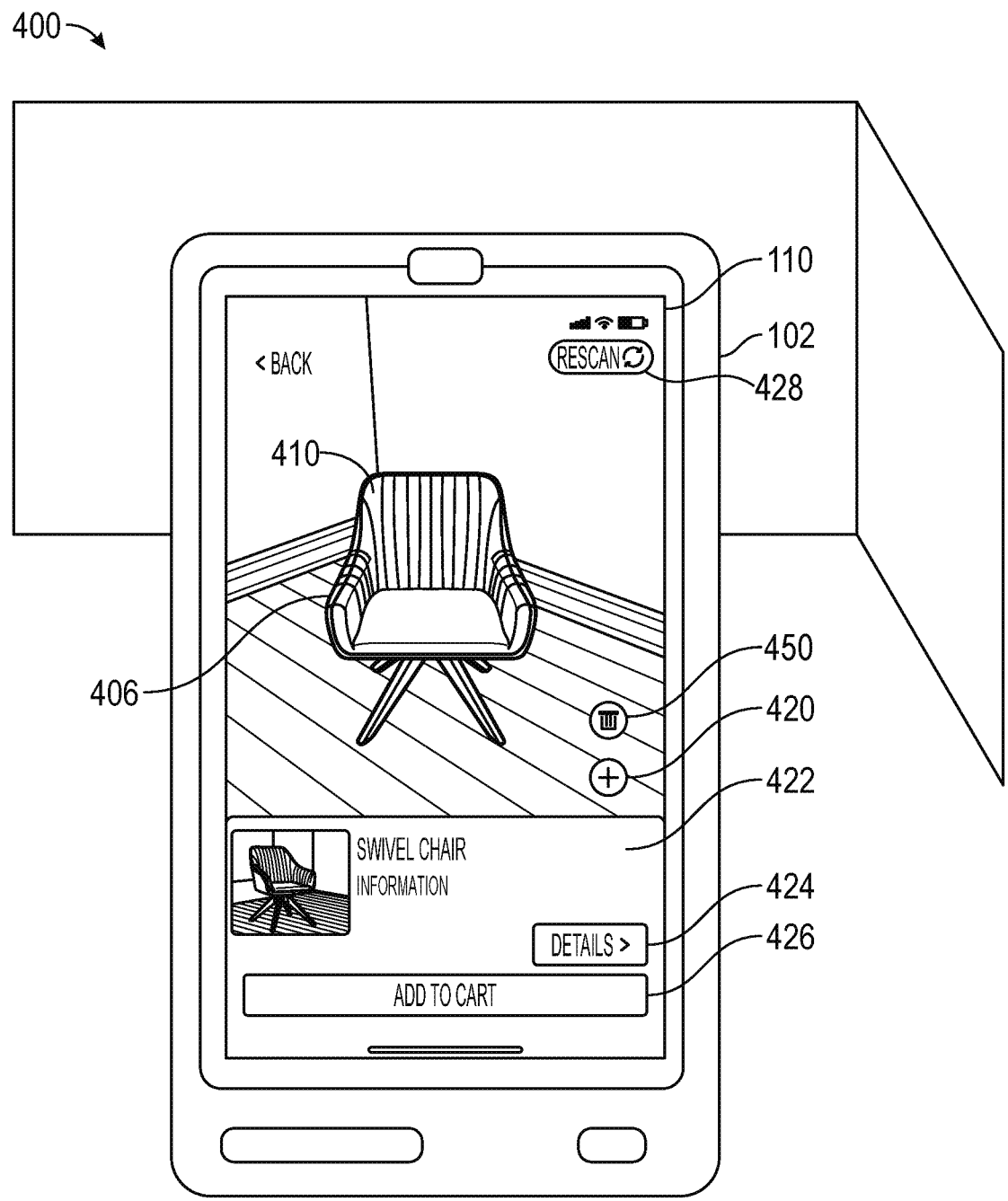

At block 304, the AR component renders a first virtual representation of the first item (e.g., item 402) on a screen (e.g., screen 110) of the computing device. As shown in FIG. 4B, for example, the AR component renders virtual representation 410 of item 402 on the screen. In one embodiment, once the button prompt 404 is selected, the AR component can prompt the user to point the computing device towards the floor so that the computing device can scan the floor using a camera (e.g., camera 216). Once a plane is detected from the scan, the AR component allows the user to place the first virtual representation (e.g., virtual representation 410) of the first item on the plane. As shown in FIG. 4B, the AR component can also provide a button prompt 428, which triggers the AR component to re-scan the environment when selected.

At block 306, the AR component presents an "add" prompt on the screen of the computing device. As shown in FIG. 4B, for example, once the virtual representation 410 is rendered and selected, the AR component presents a button prompt 420 on the screen of the computing device. The button prompt 420 enables the user to add preview additional item(s) within the physical environment 400. For example, when selected, the button prompt 420 can trigger the AR component to present one or more additional items associated with the item 402 that the user can preview within the AR simulation.

In one embodiment, the button prompt 420 is shown when the virtual representation 410 is selected and is dismissed (or removed) when the virtual representation 410 is deselected. The AR component can render (or display) a selection outline 406 (e.g., around the border of virtual representation 410) to indicate when the virtual representation 406 is selected. In some embodiments, the selection outline 406 can be rendered with a color or highlighting different than that of the virtual representation 410 to indicate it is selected. As also shown in FIG. 4B, the AR component provides a button prompt 450, when the virtual representation 410 is selected. In one embodiment, when the button prompt 450 is selected, the AR component can remove the virtual representation 410 from the screen (e.g., return to the product detail page for the item 402).

As also shown in FIG. 4B, once the virtual representation 410 is placed on the screen 110, the AR component presents a panel (or product sheet) 422, which includes information associated with the item 402. The panel 422 can be shown to the user to help the user decide whether to purchase the item 402. For example, the panel 422 may display a subset of information (e.g., price, visual depiction, name, etc.) from the product detail page for the item 402. The panel 422 includes a button prompt 424, which triggers the AR component to present further information (e.g., reviews, ratings, etc.) from the product detail page for the item 402 when selected, and a button prompt 426, which triggers the AR component to add the item 402 to the user's virtual shopping cart when selected. In one embodiment, the panel 422 is shown when the virtual representation 410 is selected and dismissed (or removed) when the virtual representation 410 is deselected.

Note that while FIG. 4B depicts the AR component modifying the virtual representation by rendering an outline 406 to indicate when the virtual representation 410 is selected, the AR component can modify other attributes (e.g., shading, highlighting, color, opacity, size, etc.) of the virtual representation 410 to indicate selection.

Figure 4C:
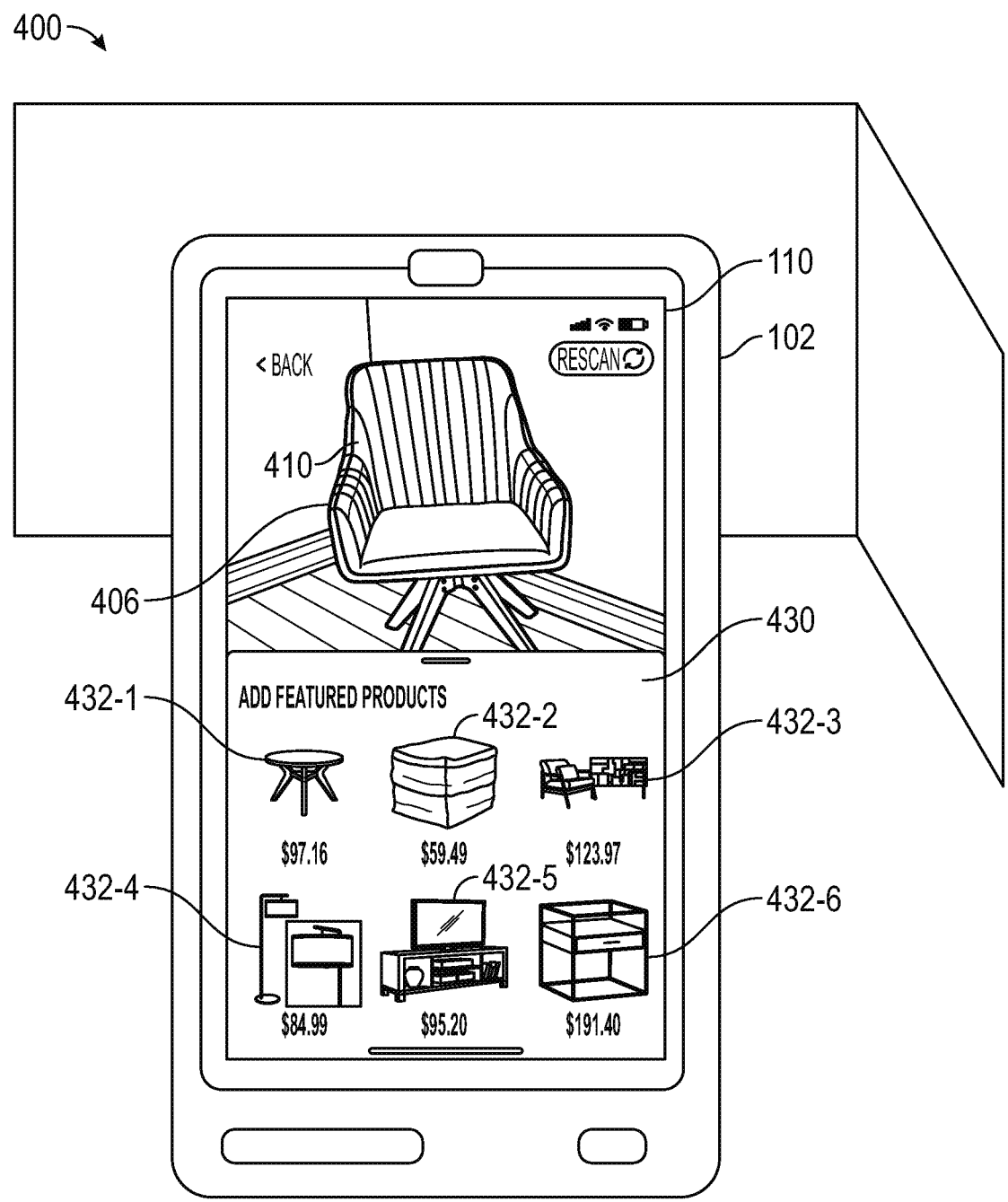

Referring back to FIG. 3, at block 308, the AR component determines whether the "add" prompt (e.g., button prompt 420) is selected. If the "add" prompt is not selected, then the method 300 exits. In one embodiment, the AR component may continue the AR simulation until the user exits the AR simulation and/or deletes the first virtual representation. On the other hand, if the "add" prompt is selected, then the AR component presents information for one or more second items associated with the first item on the screen (block 310). As shown in FIG. 4C, for example, the AR component presents a panel 430, which includes a visual depiction of items 432 1-6. In one embodiment, the AR component may retrieve the items 432 1-6 from a database (e.g., database 256). The items 432 may be based on a set of recommendations (e.g., recommendations 260) for the item 402. For example, the items 432 may be items that are frequently purchased along with the item 402, items that belong to a same set of items as the item 402, etc. In one embodiment, the items 432 may be determined using one or more machine learning techniques.

In some embodiments, as opposed to the information for the second item(s) being based solely on the initial (first) item, the information for the second item(s) may be based on any one of or combination of the items that the user is previewing during the AR simulation. For example, assume the user is previewing a table and a lamp during the AR simulation, and wishes to view information for an additional item(s). In this example, the AR component can present information for additional item(s) based on (i) the table, (ii) the lamp, or (iii) the table and the lamp. In some embodiments, the information for the second item(s) may be one or more categories of items. For example, assuming the user is previewing dining room furniture, the AR component can present information indicating a first category of items (e.g., tables), a second category of items (e.g., chairs), and so on. In this embodiment, the user can further select on a particular category to view one or more items within the selected category.

Figure 4D:
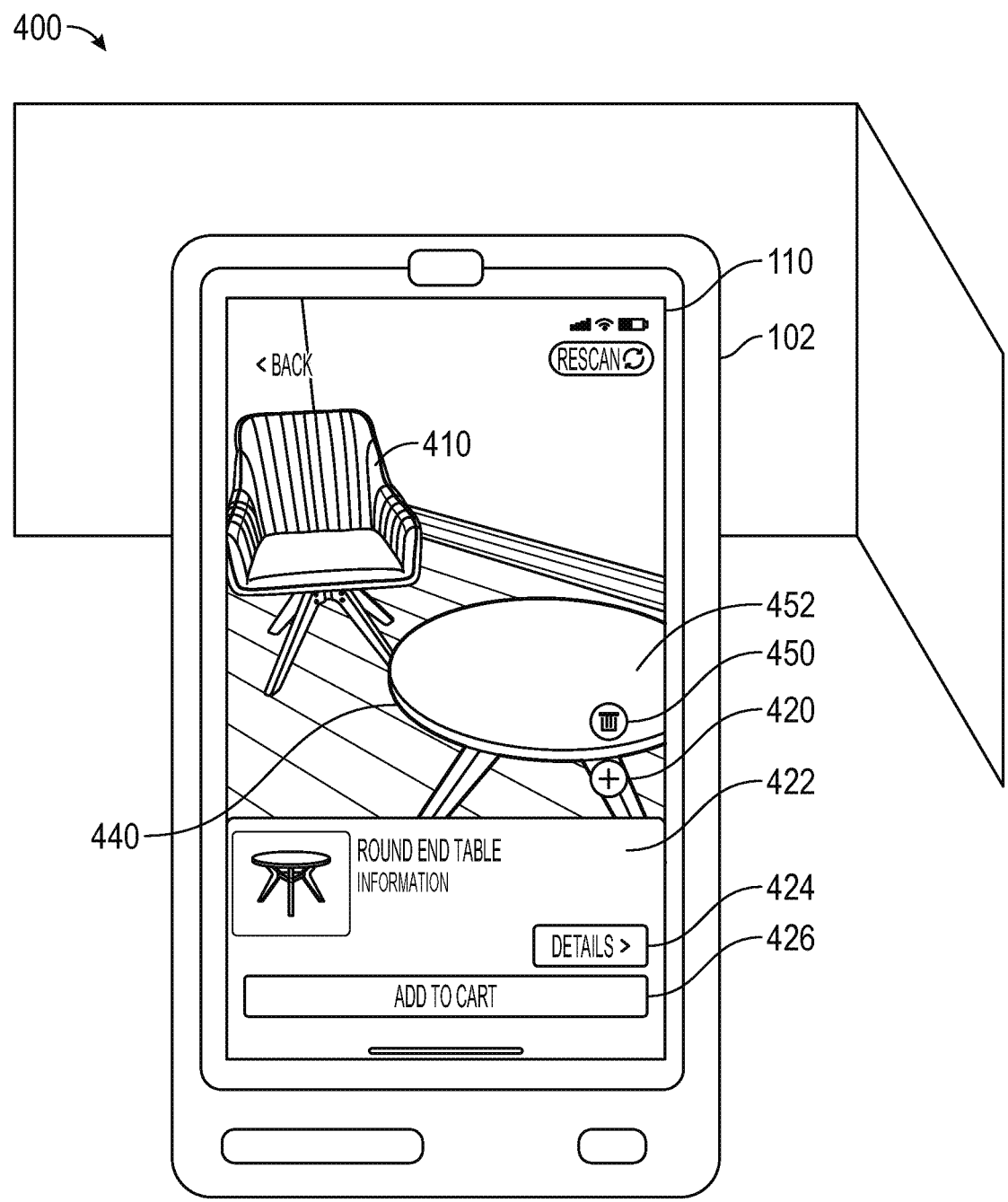

At block 312, the AR component determines whether a second item (e.g., an item 432 within panel 430) is selected. If a second item has been selected, then the AR component renders a second virtual representation of the second item on the screen. As shown in FIG. 4D, for example, assuming item 432-1 is selected, the AR component renders virtual representation 452 of the item 432-1 on the screen 110. In some embodiments, if the virtual representation 452 is not available (e.g., within storage) on the computing device, the AR component may retrieve the virtual representation from a database (e.g., database 256). During this time, the AR component may display a loading bar and a cursor that allows the user to choose the anchor location within the physical environment, prior to rendering the virtual representation 452.

As shown in FIG. 4D, the virtual representation 452 is shown with a selection outline 440 to indicate that it is selected (as opposed to virtual representation 410). The AR component also presents panel 422 which provides a subset of information (e.g., price, visual depiction, name, etc.) from the product detail page for the item 432-1. For example, when the user selects a different virtual representation (e.g., virtual representation 452) within the AR simulation, the AR component can update the panel 422 with the relevant information for the respective item (e.g., item 432-1).

In some embodiments, when interacting with a given virtual representation, the AR component can remove (or fade away) the various button prompts and panels to give the customer a larger view of the scene. With reference to FIG. 4D, for example, assuming the user were to rotate or drag virtual representation 452 across the screen, the AR component can remove panel 422, button prompt 420, and/or button prompt 450.

In some embodiments, the AR component may enter an "auto-place mode" upon detecting a request (e.g., from a user) to visualize an item during the AR simulation. In method 300, for example, the AR component can enter the "auto-place mode" in order to render the first virtual representation on the screen (block 304). Additionally or alternatively, the AR component can enter the "auto-place mode" in order to render the second virtual representation on the screen (block 314). During the "auto-place mode," the AR component can render a given virtual representation on the screen for positions on the plane that are within a predetermined range of distances (from the computing device) and may refrain from rendering the virtual representation on the screen for positions on the plane that are outside of the predetermined range of distances (from the computing device). The predetermined range of distances may be determined based at least in part on (i) one or more physical attributes (e.g., physical dimensions) of the screen and (ii) one or more physical attributes of the virtual representation. More details describing how the AR component determines the predetermined range of distances for when to render a virtual representation of an item can be found in U.S. patent application Ser. No. 16/836,184, filed Mar. 31, 2020, which is expressly incorporated by reference herein.

Figure 5:
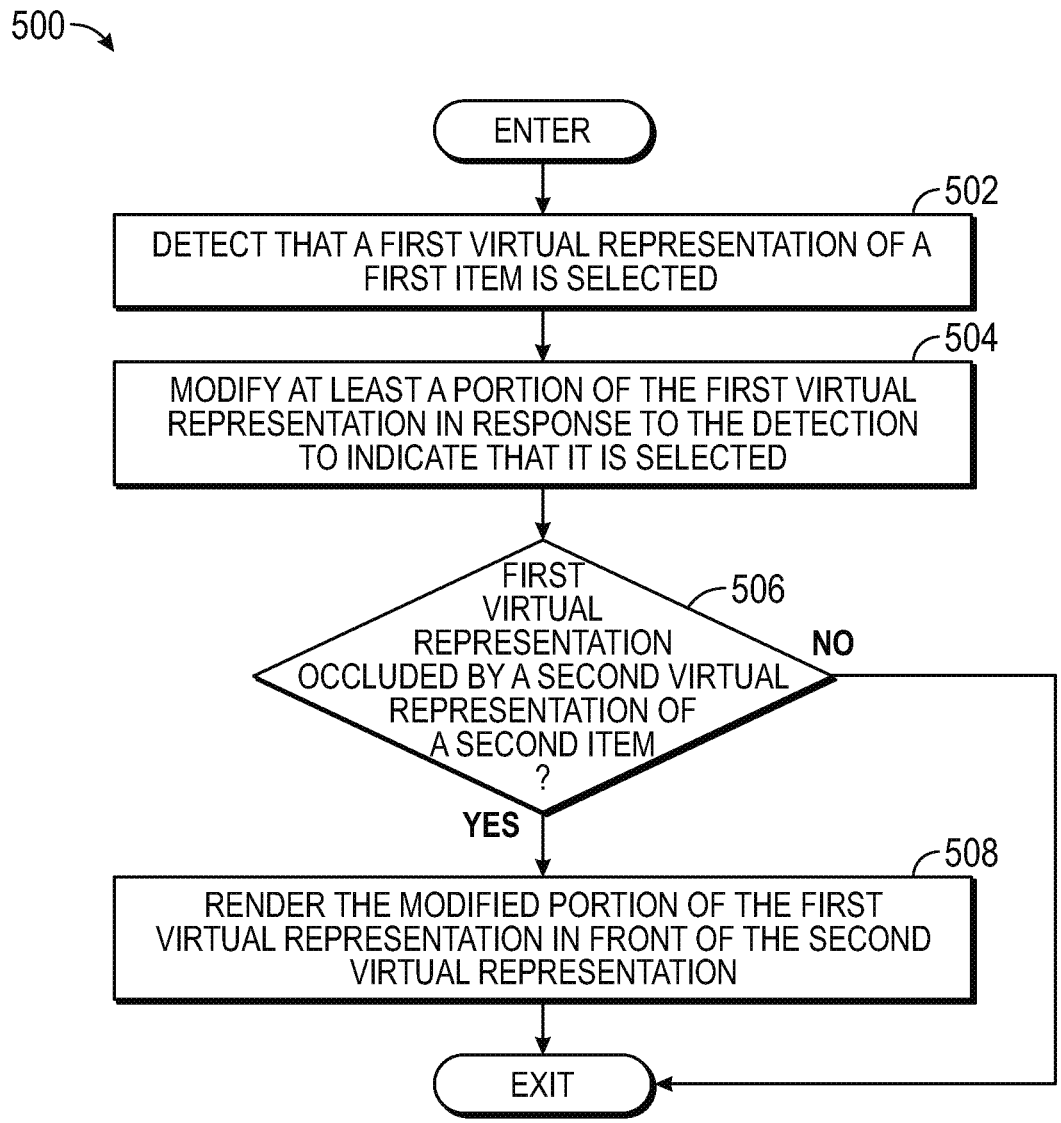
FIG. 5 is a flowchart of a method for providing feedback regarding occluded virtual objects within an AR simulation on a computing device, according to one embodiment.

FIG. 5 is a flowchart of a method 500 for providing feedback regarding occluded virtual objects within an AR simulation on a computing device, according to one embodiment. The method 500 may be performed by an AR component (e.g., AR component 210) and/or one or more components of a computing device (e.g., computing device 102).

Method 500 enters at block 502, where the AR component detects that a first virtual representation of a first item is selected. At block 504, the AR component modifies at least a portion of the first virtual representation in response to the detection to indicate that it is selected. For example, the AR component can render a modified representation of the first virtual representation to indicate that it is selected. In one embodiment, the AR component can render a selection outline (e.g., selection outline 406) around the first virtual representation to indicate that it is selected. In other embodiments, can modify other attributes (e.g., highlighting, opacity, size, color, etc.) of the first virtual representation in order to indicate that it is selected.

At block 506, the AR component determines whether at least one portion of the first virtual representation is occluded by a second virtual representation of a second item. For example, while interacting with a given virtual representation, the user may manipulate the first virtual representation (e.g., dragging, rotating, etc.) such that it moves behind the second virtual representation within the AR simulation. If the AR component determines that the first virtual representation is at least partially occluded by the second virtual representation, then the AR component renders the modified portion of the first virtual representation in front of the second virtual representation (block 508). In this manner, the AR component can provide visual feedback (or a visual indication) of when and how the first virtual representation is occluded by the second virtual representation.

Figure 6A:
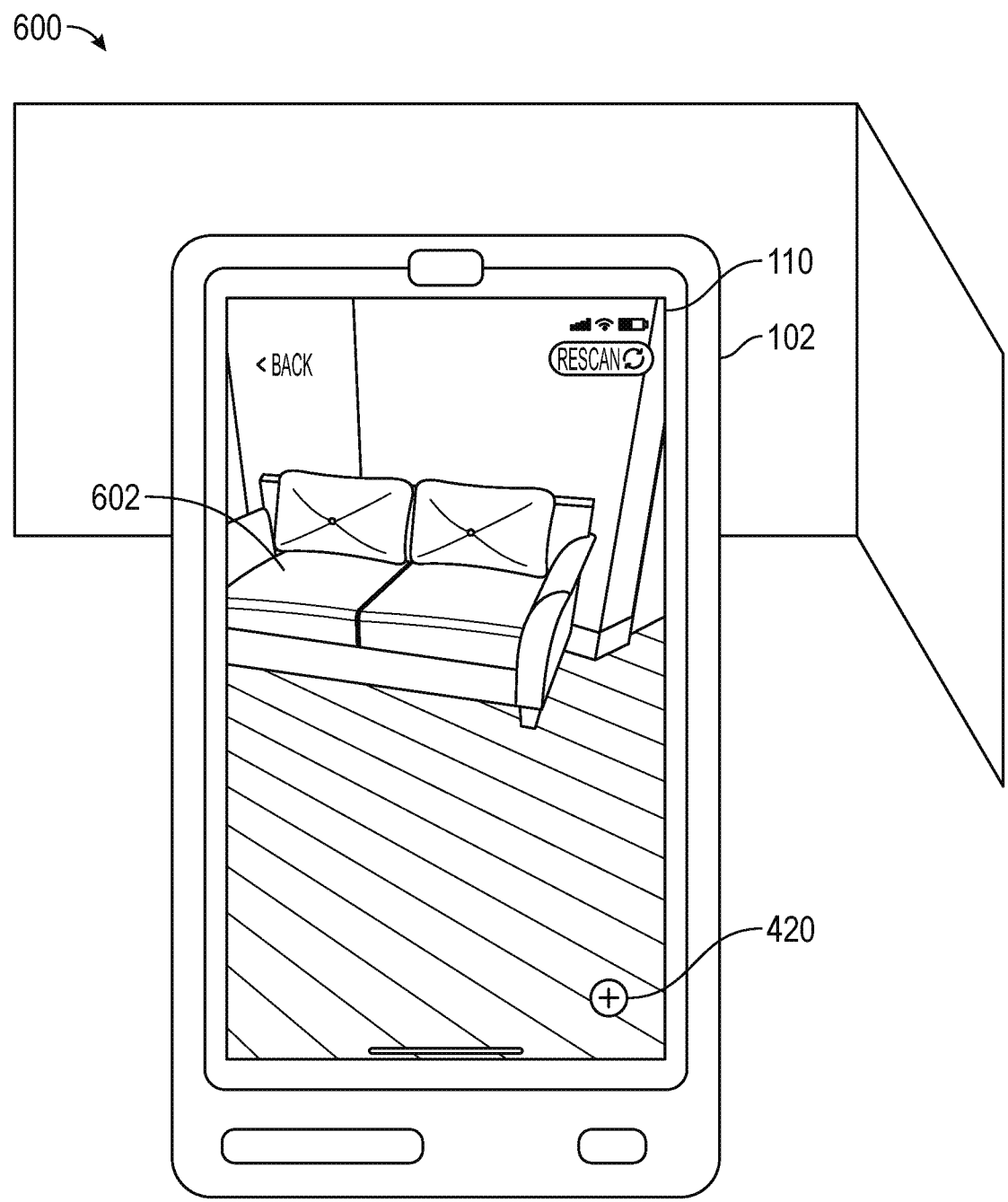
FIGS. 6A-6C illustrate an example scenario of providing feedback regarding occluded virtual objects within an AR simulation on a computing device, according to one embodiment.
Figure 6B:
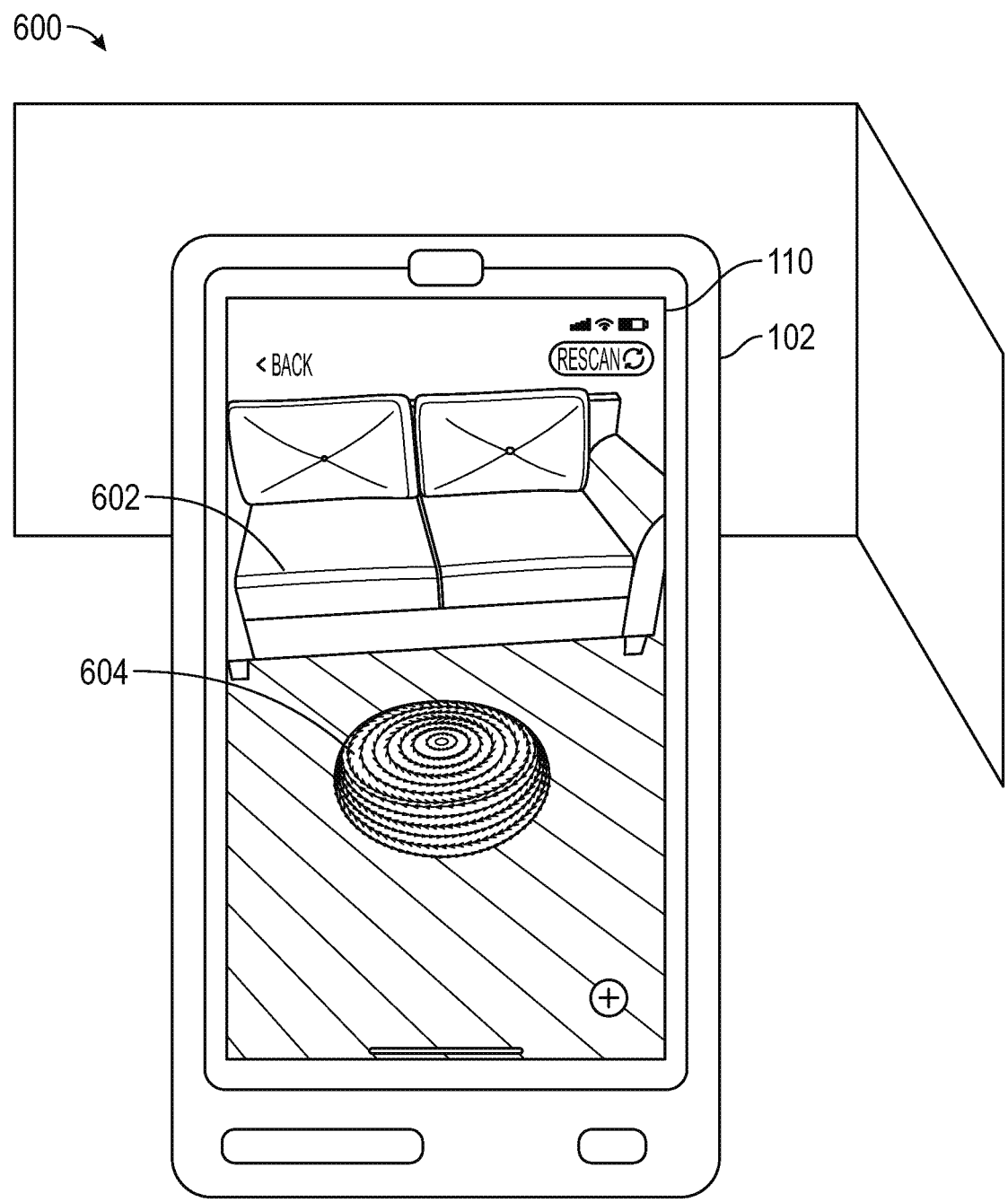
Figure 6C:
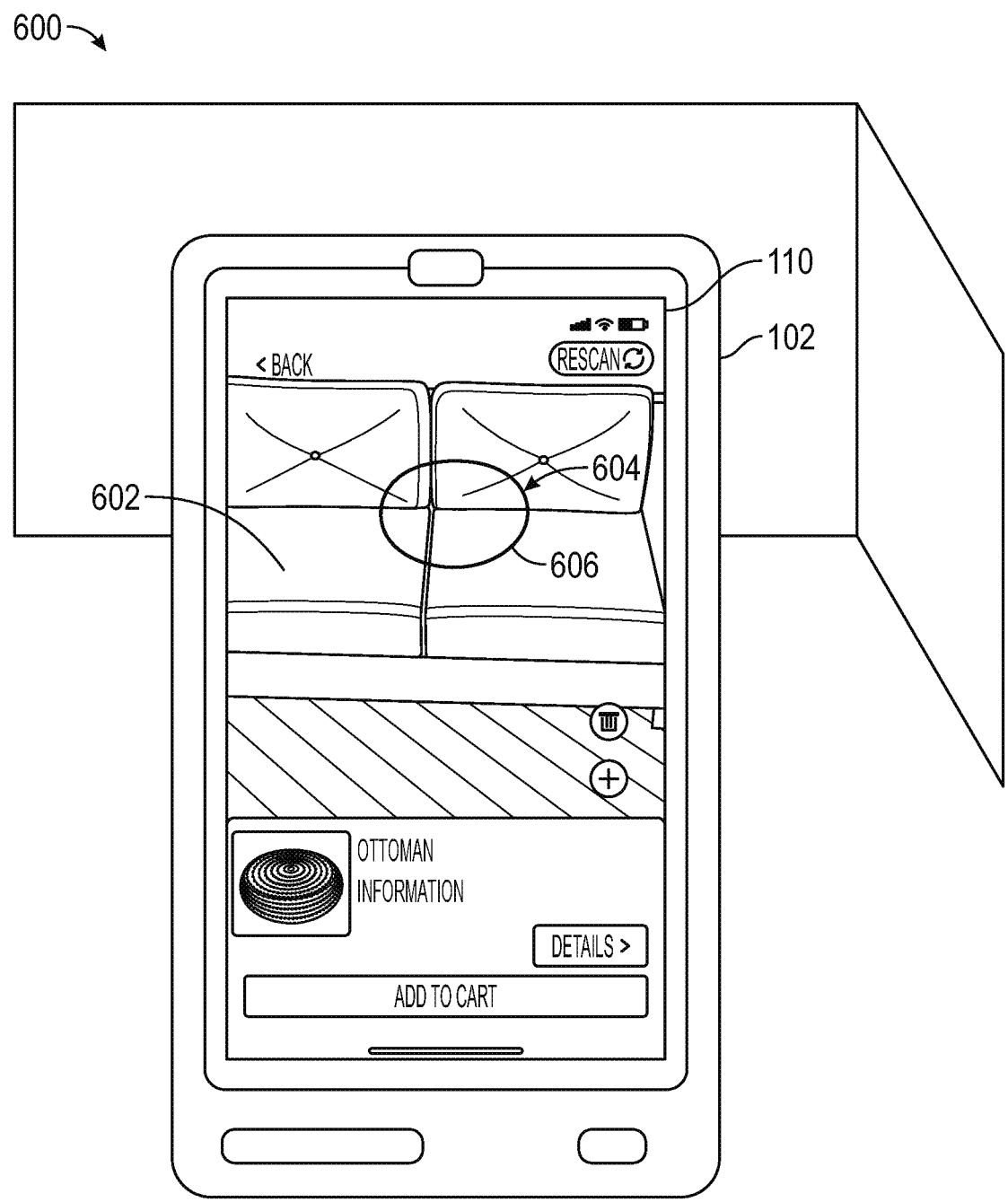

FIGS. 6A-6C illustrate an example scenario of providing feedback regarding an occluded virtual object during an AR simulation in a physical environment 600, according to one embodiment. As shown in FIG. 6A, after the virtual representation 602 is rendered on the screen 110 of the computing device 102, the user can select button prompt 420 to browse for an additional item to preview within the AR simulation.

Subsequently, as shown in FIG. 6B, once an additional item is selected, the AR component renders the virtual representation 604 of the additional item on the screen 110.

The user may select virtual representation 604 to manipulate the virtual representation. For example, the user can select the virtual representation 604 to drag the virtual representation 604, rotate the virtual representation 604, etc. In some cases, while interacting with the virtual representation 604, the user may move the virtual representation 604 to a position in which the virtual representation is occluded by the virtual representation 602. As shown in FIG. 6C, for example, the user moves virtual representation 604 to a position behind the virtual representation 602. When this occurs, the AR component renders the selection outline 606 of the virtual representation 604 in front of the virtual representation 602 to indicate to the user where the virtual representation 604 is located.

Figure 7:
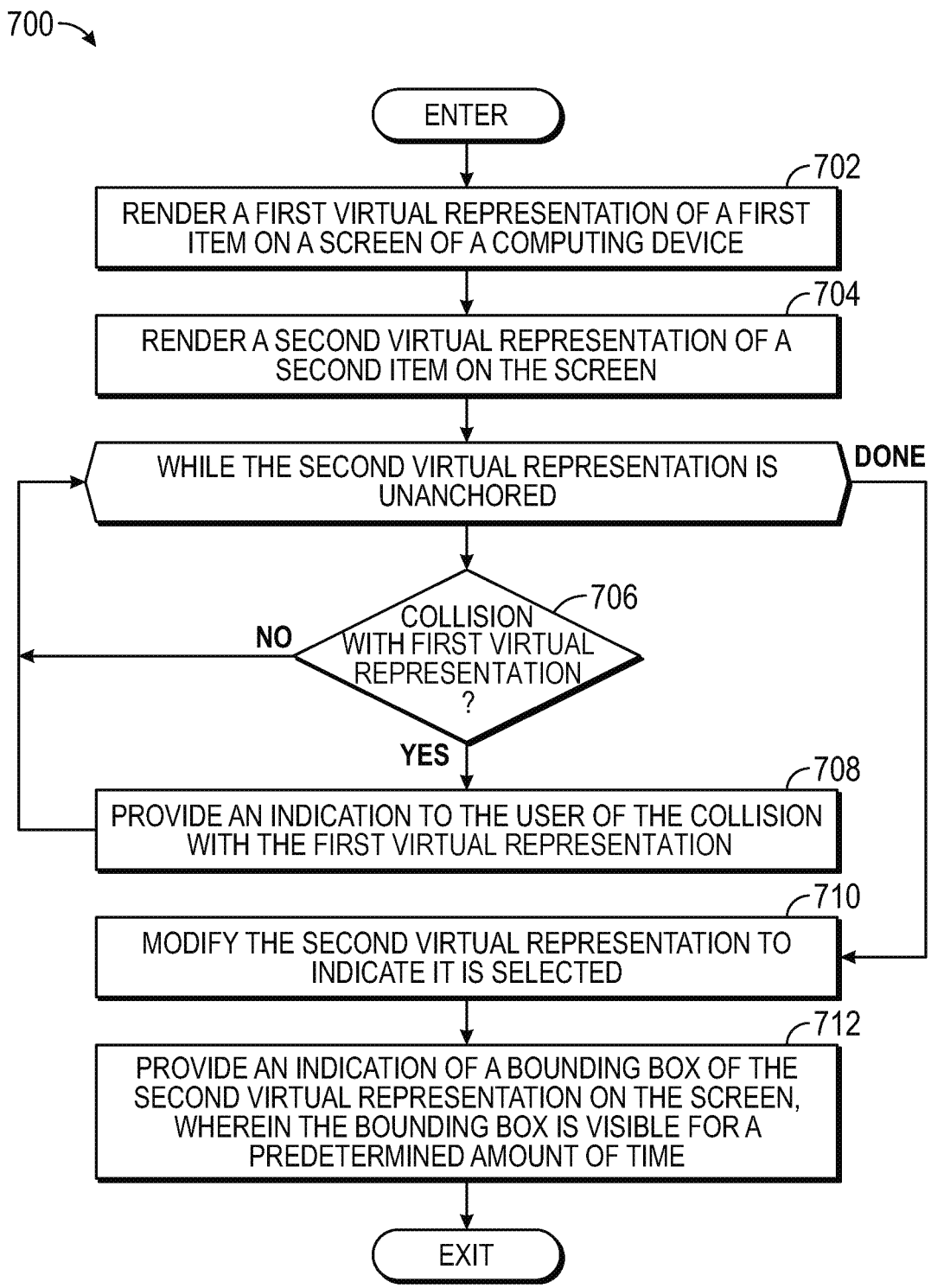
FIG. 7 is a flowchart of a method for providing feedback regarding virtual object collisions during an AR simulation on a computing device, according to one embodiment.

FIG. 7 is a flowchart of a method 700 for providing feedback regarding virtual object collisions during an AR simulation on a computing device, according to one embodiment. The method 700 may be performed by an AR component (e.g., AR component 210) and/or one or more components of a computing device (e.g., computing device 102).

Figure 9A:
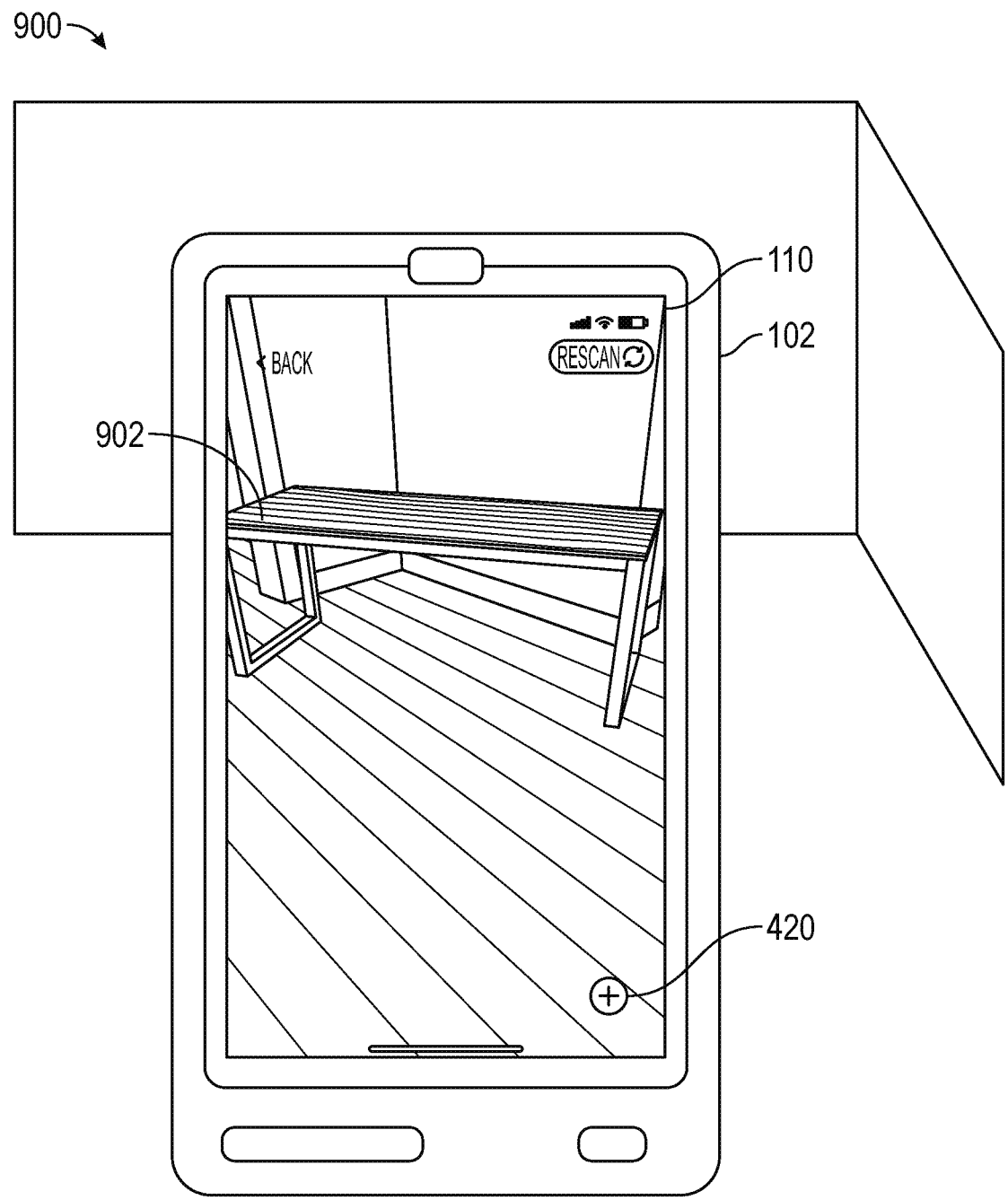
FIGS. 9A-9G illustrate an example scenario of visualizing multiple virtual objects during an AR simulation on a computing device, according to one embodiment.

Method 700 enters at block 702, where the AR component renders a first virtual representation of a first item on a screen (e.g., screen 110) of a computing device (e.g., computing device 102). As shown in FIG. 9A, for example, the AR component renders virtual representation 902 of an item (e.g., table) on the screen 110 of the computing device 102 in order to preview the item within the physical environment 900.

Figure 9B:
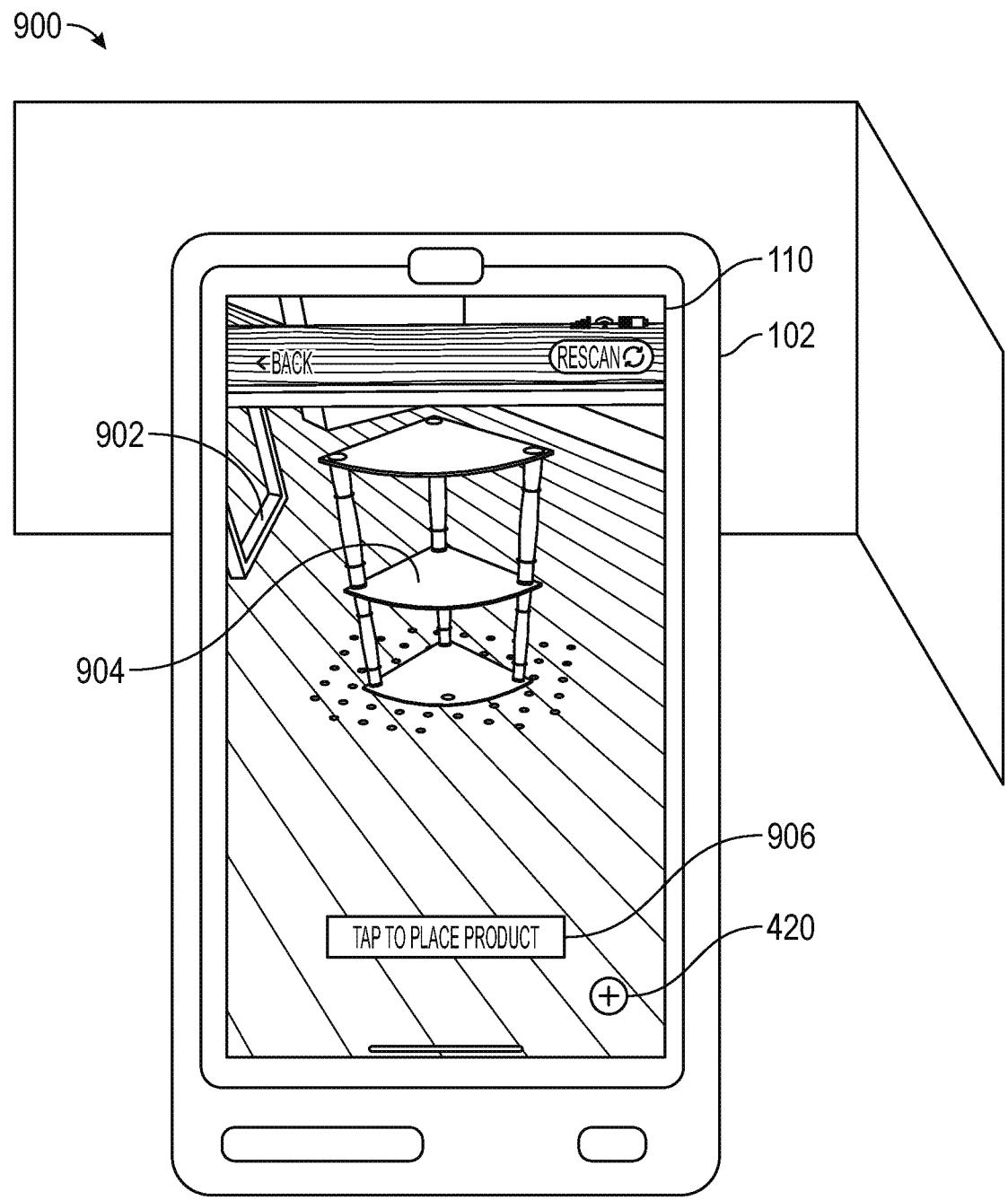

At block 704, the AR component renders a second virtual representation of a second item on the screen. For example, the user may select button prompt 420 to browse a set of additional items associated with the item (e.g., table) and select one of the additional items to preview during the AR simulation. The AR component can retrieve the second virtual representation (e.g., from database 256) (corresponding to the selected item) and render the second virtual representation on the screen. As shown in FIG. 9B, the AR component renders virtual representation 904 on the screen and provides an instruction 906 on the screen indicating that the user can tap on the screen to anchor the virtual representation 904. Here, the AR component can enter an "auto-place mode," in which the virtual representation 904 is rendered on the screen at positions that are within a predetermined range of distances from the computing device, before the virtual representation 904 becomes anchored to a given position.

Referring back to FIG. 7, while the second virtual representation (e.g., virtual representation 904) is unanchored (e.g., during "auto-place mode" for the second virtual representation), the AR component determines whether the second virtual representation collides with the first virtual representation (block 706). For example, the AR component may detect a collision when the bounding box of the second virtual representation of the second item overlaps any portion of the bounding box of the first virtual representation of the first item. As noted above, the bounding box associated with a given virtual representation of an item may have the minimum set of dimensions (e.g., length, width, height) that fully enclose the virtual representation. As used herein, a bounding box may also be referred to as a bounding volume (e.g., a closed volume that completely contains the virtual representation).

Figure 9C:
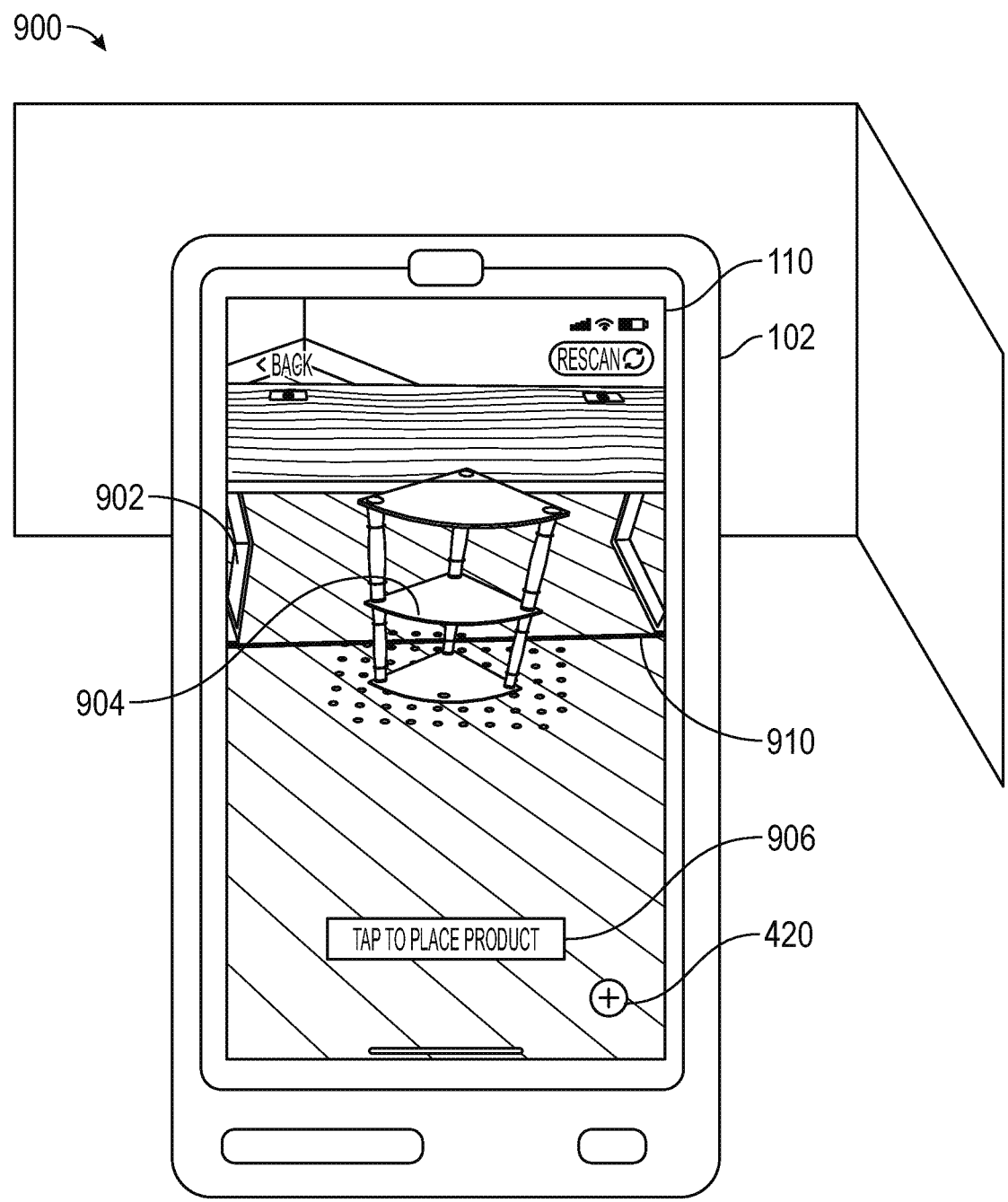

If the AR component detects a collision, then the AR component provides an indication to the user of the collision with the first virtual representation (block 708). For example, as shown in FIG. 9C, while the virtual representation 904 is unanchored, the user changes the orientation of the computing device so that the (transparent bounding box of) virtual representation 904 collides with the (transparent bounding box of) virtual representation 902. In response to this detection, the AR component provides a visual indication of the bounding box 910 of the virtual representation 902. In one embodiment, the AR component may display the bounding box 910 for a predetermined amount of time (e.g., starting from the time that each collision is detected). Additionally or alternatively, the AR component can trigger the haptic device 224 to generate a haptic feedback signal to indicate to the user that a collision has occurred with the virtual representation 904 during the AR simulation.

Figure 9D:
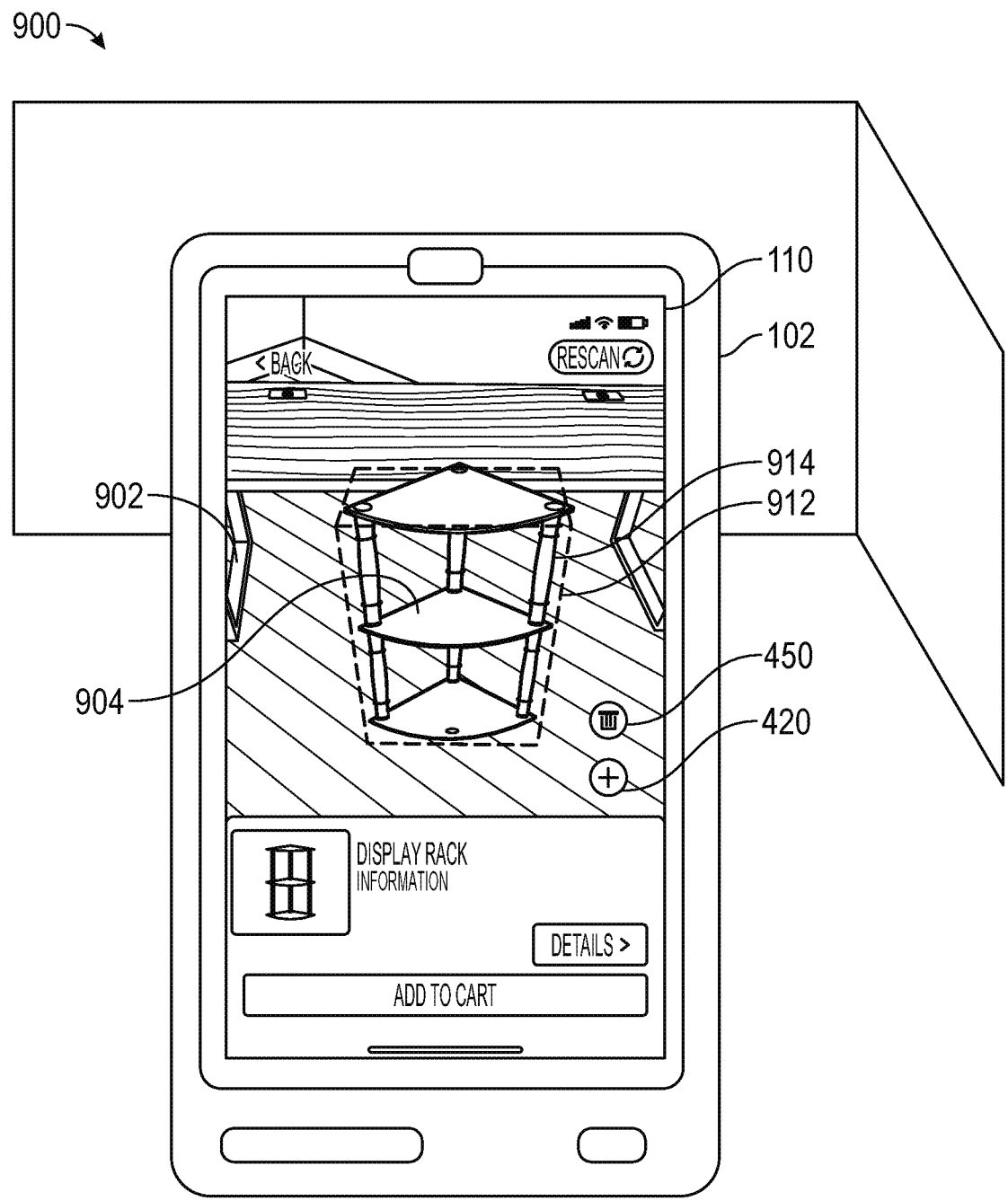

Once the virtual representation is anchored, at block 710, the AR component modifies the second virtual representation to indicate it is selected. At block 712, the AR component provides an indication of a bounding box of the second virtual representation on the screen, where the bounding box is visible for a predetermined amount of time. For example, as shown in FIG. 9D, the AR component renders the selection outline 914 to indicate to the user that the virtual representation 904 is selected. Additionally, the AR component renders the bounding box 912 of the virtual representation 904 on the screen. The bounding box 912 may be visible for a predetermined amount of time. For example, once the predetermined amount of time has elapsed, the bounding box 912 can fade away from the screen. Note, however, that this is merely one example of how the AR component can stop displaying the bounding box 912.

Figure 8:
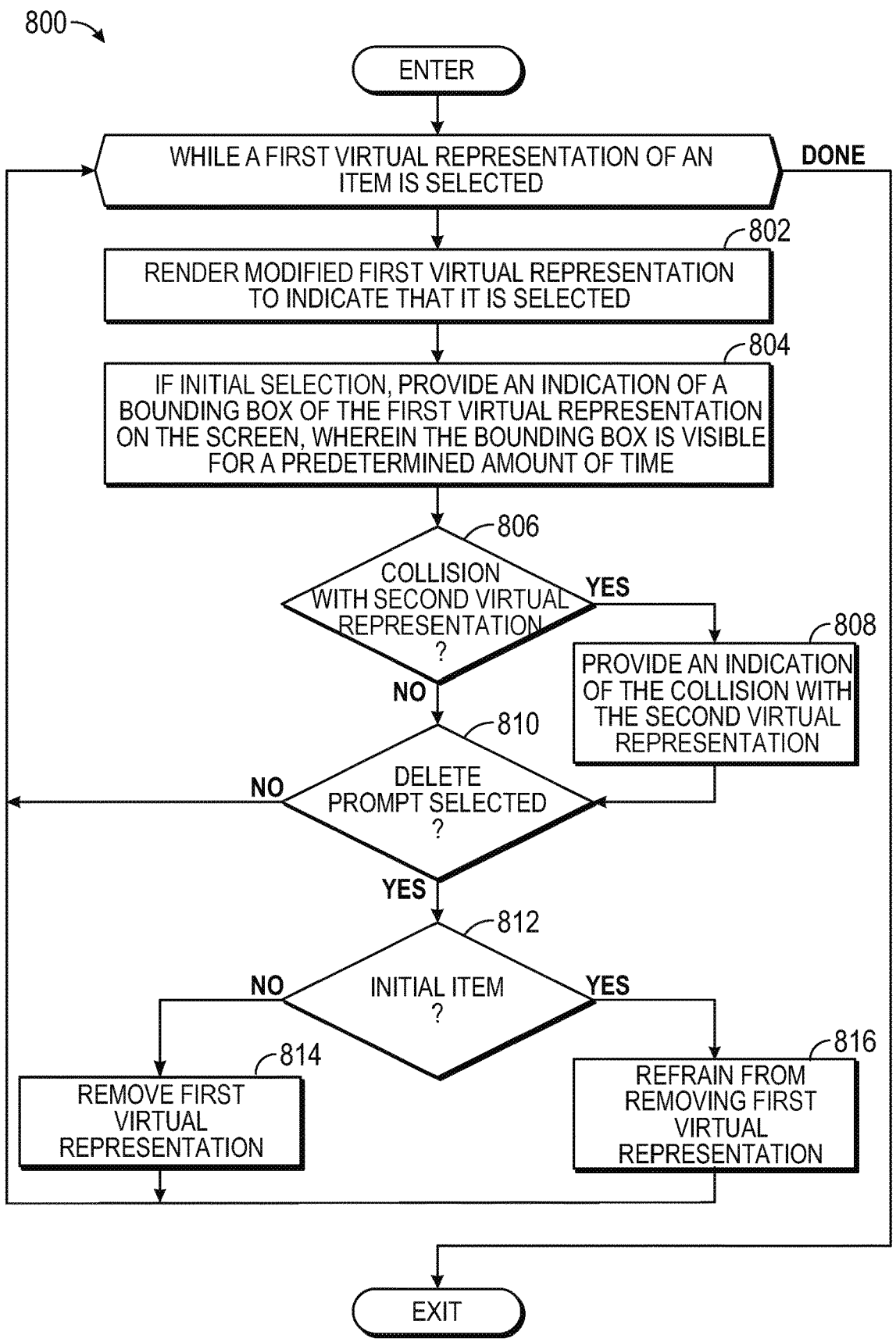
FIG. 8 is a flowchart of another method for providing feedback regarding virtual object collisions during an AR simulation on a computing device, according to one embodiment.

FIG. 8 is a flowchart of a method 800 for providing feedback regarding virtual object collisions during an AR simulation on a computing device, according to one embodiment. The method 800 may be performed by an AR component (e.g., AR component 210) and/or one or more components of a computing device (e.g., computing device 102). In one embodiment, the method 800 is performed while a first virtual representation of an item is selected within an AR simulation.

At block 802, the AR component renders a modified first virtual representation to indicate that it is selected. At block 804, when the first virtual representation is initially selected (or reselected) the AR component provides an indication of a bounding box of the first virtual representation on the screen, wherein the bounding box is visible for a predetermined amount of time. For example, as shown in FIG. 9D, the AR component renders the selection outline 914 to indicate to the user that the virtual representation 904 is selected, and renders the bounding box 912 of the virtual representation 904 on the screen. As noted above, the bounding box 912 may be visible for a predetermined amount of time, once it is rendered.

Figure 9E:
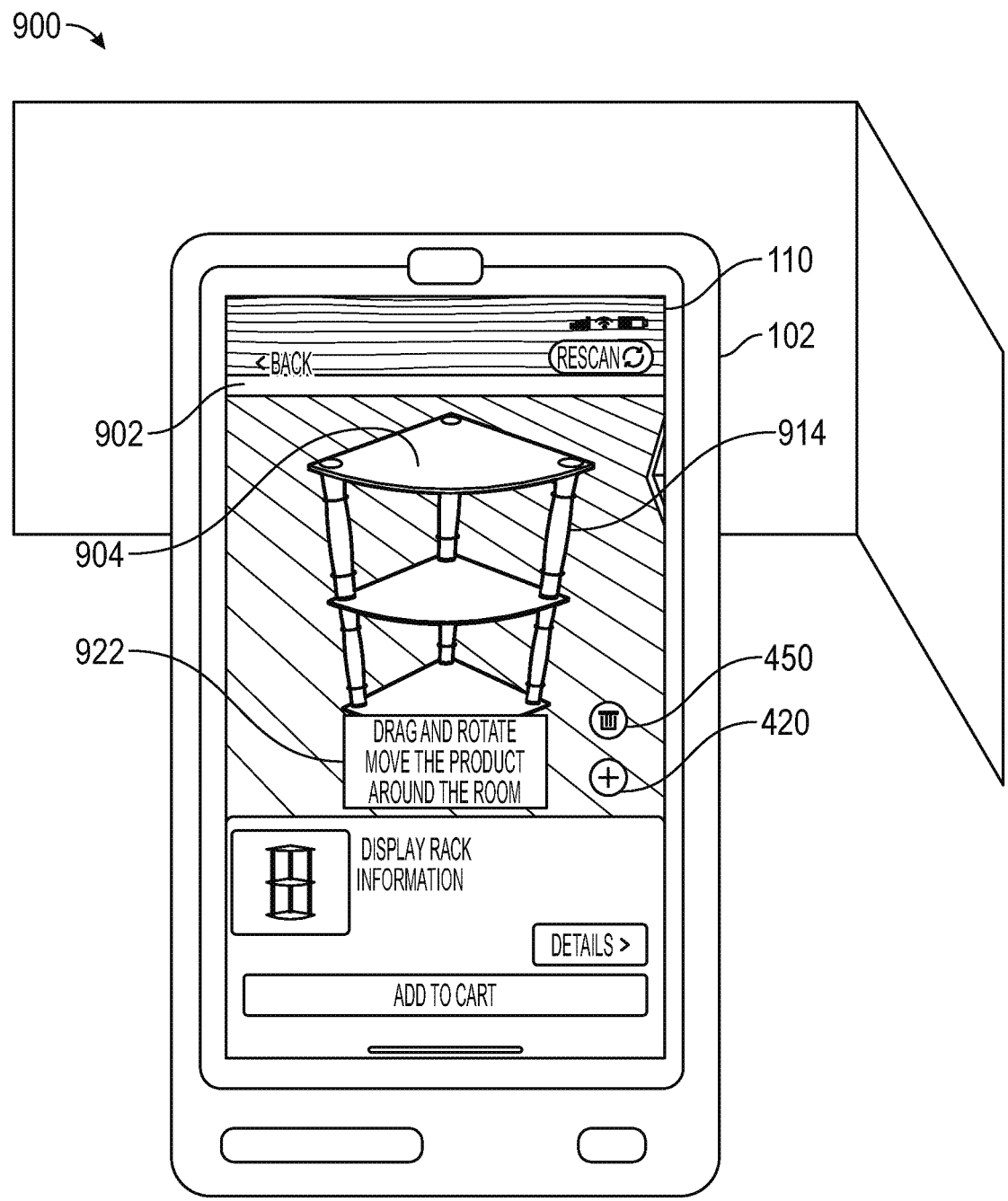

When the virtual representation 904 is selected, the user can manipulate the virtual representation 904 within the AR simulation, e.g., by dragging and/or rotating the virtual representation 904. In one embodiment depicted in FIG. 9E, the AR component can provide an instruction 922 on the screen 110 indicating to the user that the virtual representation 904 can be manipulated.

Figure 9F:
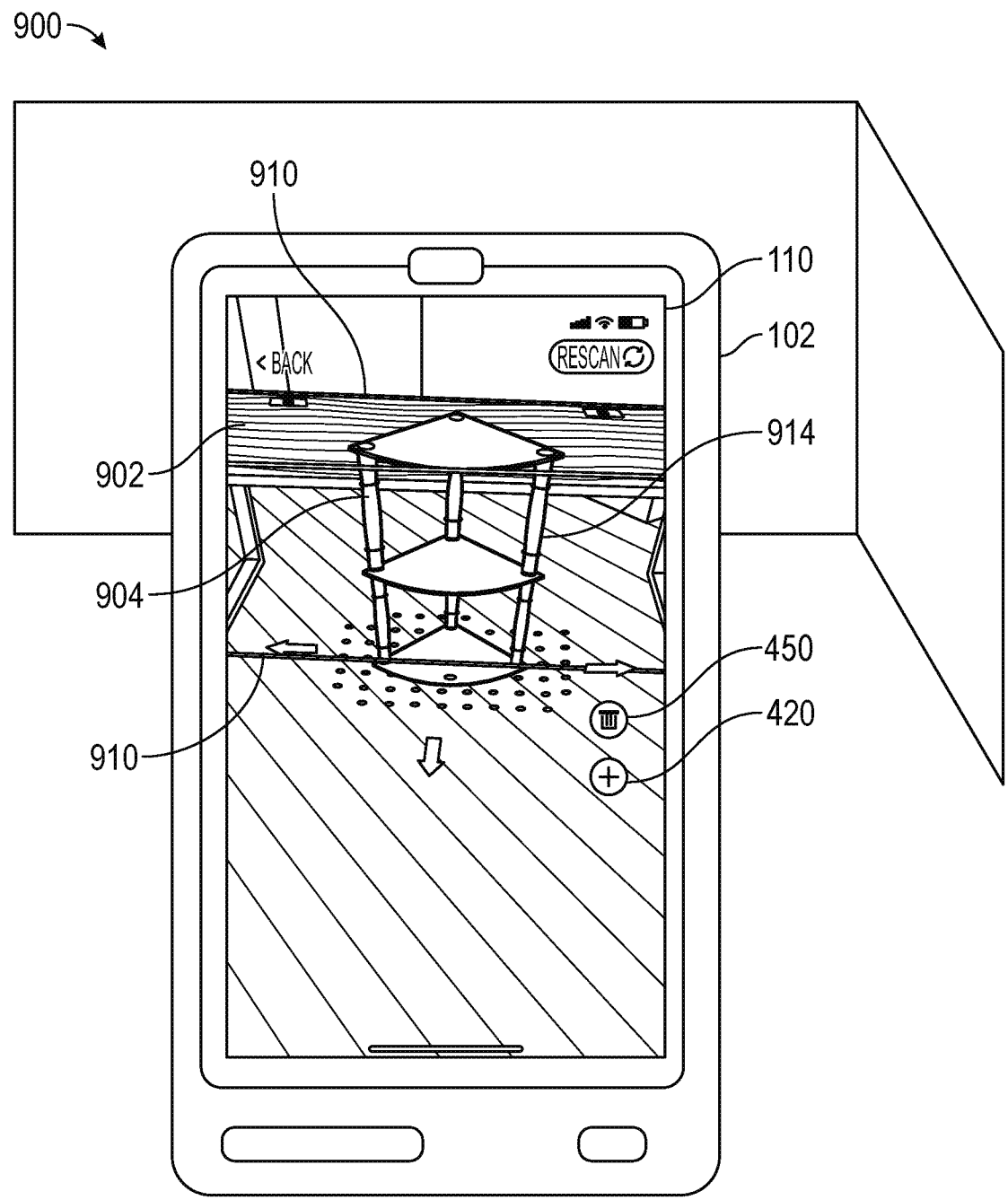
Figure 9G:
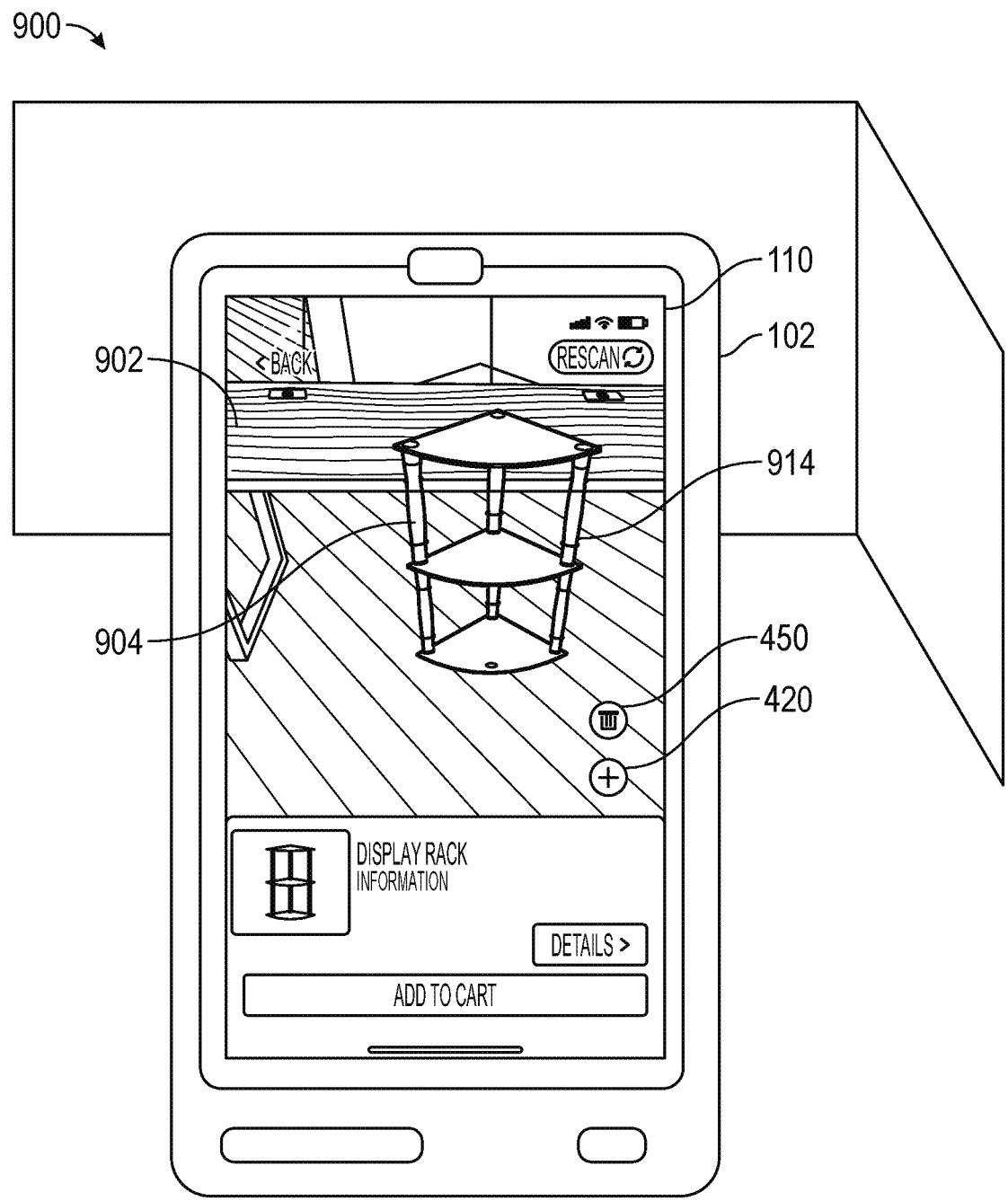

Returning to FIG. 8, at block 806, the AR component determines whether the first virtual representation (e.g., virtual representation 904) has collided with another second virtual representation on the screen. If so, at block 808, the AR component provides an indication of the collision with the second virtual representation. In one embodiment, the indication of the collision is a visual indication of the bounding box of the second virtual representation. As shown in FIG. 9F, for example, once the AR component detects a collision of the virtual representation 904 with the virtual representation 902, the AR component renders the bounding box 910 to indicate the collision. As noted above, the AR component may render the visual indication for a predetermined amount of time. For example, as shown in FIG. 9G, after the predetermined amount of time has elapsed, the AR component may remove (e.g., fade away) the bounding box 910 from the screen 110, even though the virtual representation 904 is still collided with virtual representation 902. In another embodiment (not shown), the AR component can render the bounding box 910 until the user deselects the virtual representation 904. Additionally or alternatively, the indication of the collision (at block 808) can include a haptic feedback generated by the haptic device 224.

Returning to FIG. 8, if the AR component determines that the first virtual representation has not collided with a second virtual representation, then the AR component determines whether a "delete" prompt (e.g., button prompt 450) has been selected (for the first virtual representation). If the delete prompt has not been selected, the method proceeds to block 802, where the AR component keeps rendering the modified first virtual representation on the screen.

On the other hand, if the delete prompt has been selected, then the AR component determines whether the first virtual representation is associated with an initial item of the AR simulation (block 812). If the first virtual representation is associated with the initial item, then the AR component refrains from removing the first virtual representation from the screen (block 816). In one embodiment, the AR component can provide an indication on the screen, indicating to the user that the first virtual representation cannot be removed while another virtual representation is being rendered on the screen. If the first virtual representation is not associated with the initial item, then the AR component removes the first virtual representation from the screen (block 814).

Note that, in another embodiment, the AR component can remove a virtual representation from the screen (e.g., in response to detecting that the delete prompt has been selected for the virtual representation), regardless of whether the virtual representation is associated with the initial item. In this embodiment, for example, after detecting in block 810 that the delete prompt has been selected, the AR component may proceed to block 814 (as opposed to blocks 812 and 816) to remove the virtual representation.

Figure 10:
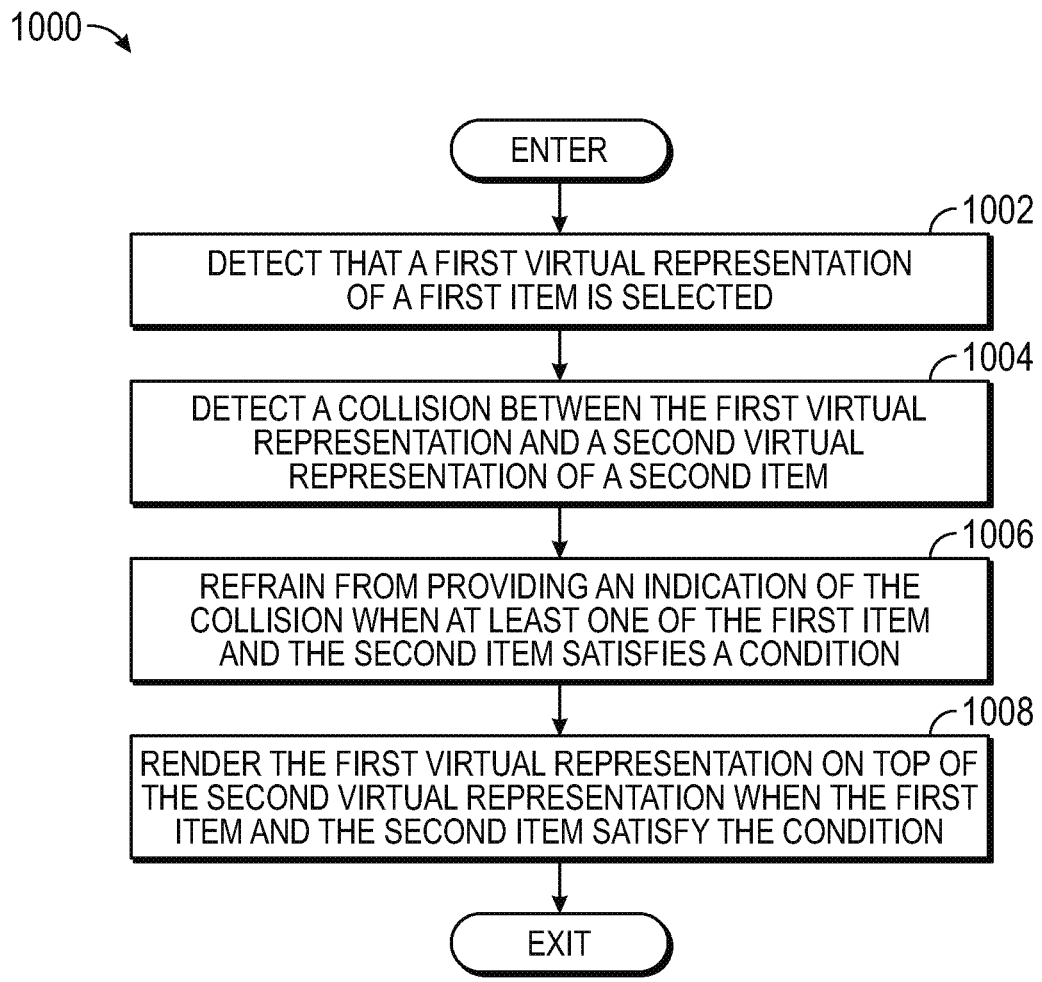
FIG. 10 is a flowchart of another method for visualizing multiple virtual objects during an AR simulation on a computing device, according to one embodiment.

FIG. 10 is a flowchart of a method 1000 for visualizing virtual objects during an AR simulation on a computing device, according to one embodiment. The method 1000 may be performed by an AR component (e.g., AR component 210) and/or one or more components of a computing device (e.g., computing device 102).

Method 1000 enters at block 1002, where the AR component detects that a first virtual representation of a first item is selected. At block 1004, the AR component detects a collision between the first virtual representation and a second virtual representation of a second item.

At block 1006, the AR component refrains from providing an indication of the collision when at least one of the first item and the second item satisfies a predetermined condition. In one embodiment, the condition is a particular item type or item category. For example, providing an indication of collisions for certain types of items (e.g., rugs, mats, carpet, etc.) can confuse the user when viewing an AR simulation on a computing device. Hence, for these types of items, the AR component may refrain from indicating the collisions with these types of items during an AR simulation, in order to enhance the user experience when interacting with these items during the AR simulation. In another embodiment, the condition is based on an item attribute (e.g., size, dimension(s), etc.).

At block 1008, the AR component renders the first virtual representation on top of the second virtual representation when the first item and the second item satisfy the condition. For example, when the user is interacting with multiple items of a certain type (e.g., two rugs), the AR component may render the selected item on top of the other item to enhance the user experience (e.g., reducing the appearance of visual clutter).

Figure 11A:
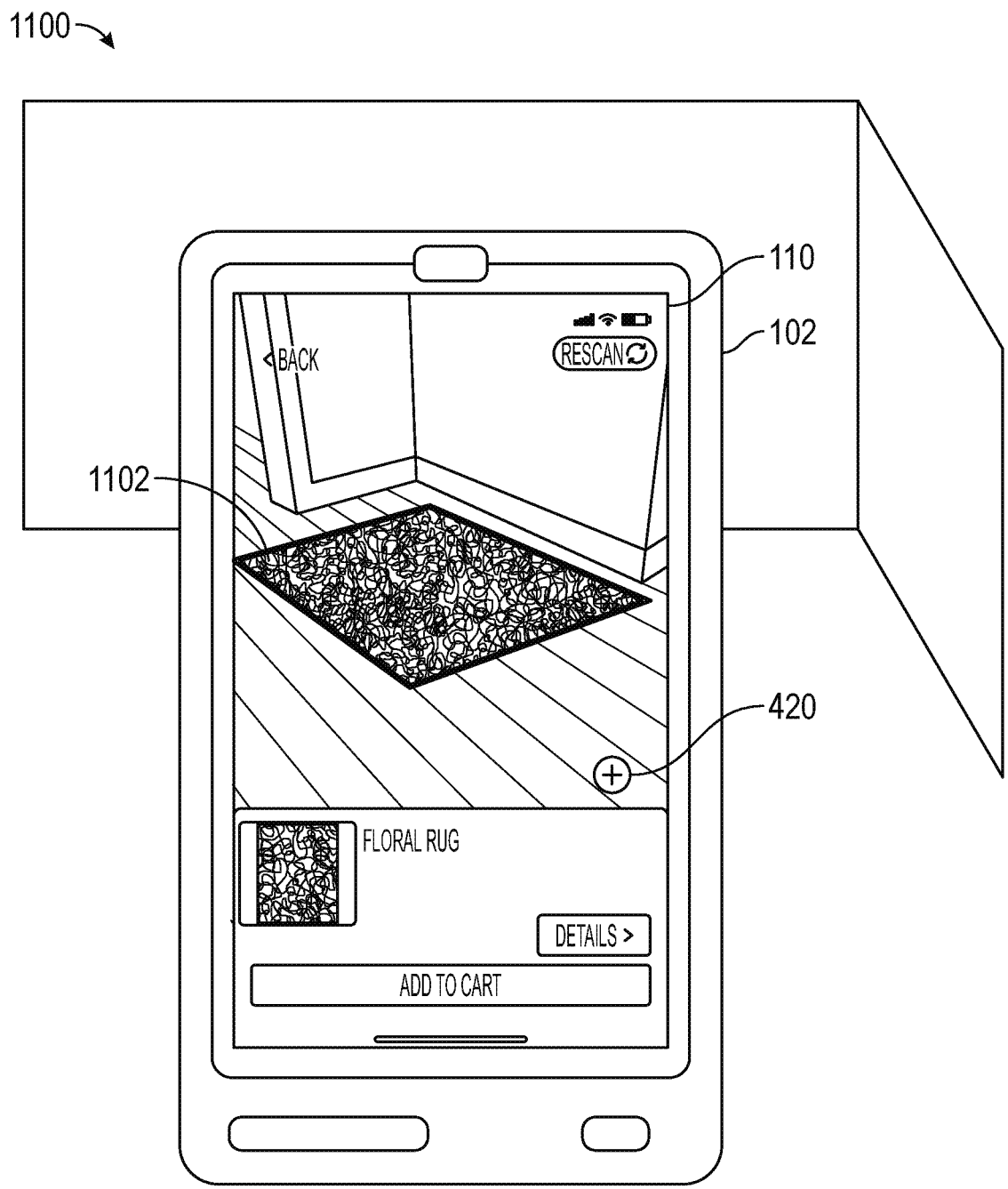
FIG. 11A-11D illustrate another example scenario of visualizing multiple virtual objects during an AR simulation on a computing device, according to one embodiment.
Figure 11B:
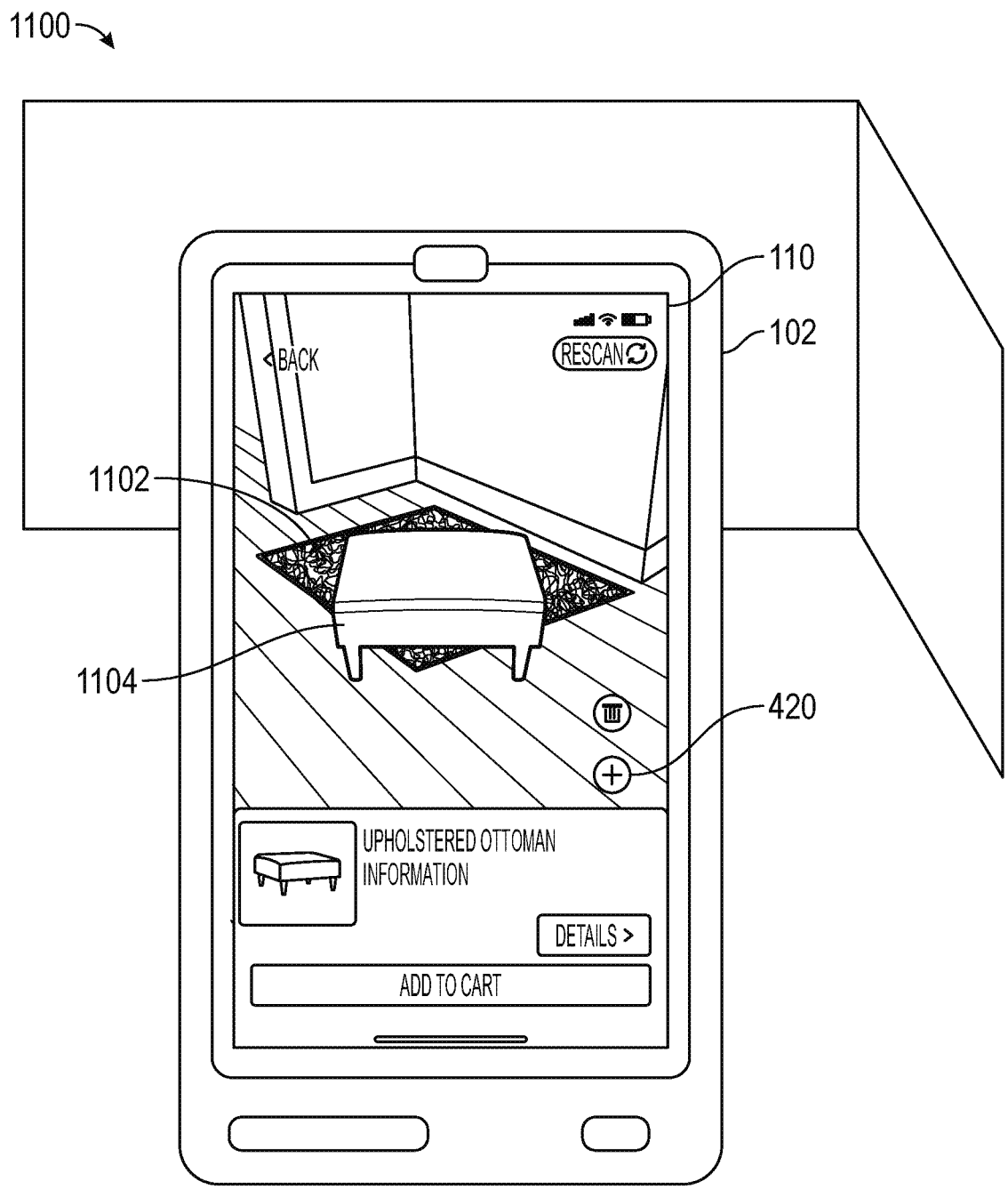

FIGS. 11A-11D illustrate an example scenario of visualizing multiple virtual objects during an AR simulation in a physical environment 1100, according to one embodiment. As shown in FIG. 11A, after the virtual representation 1102 (of a rug item) is rendered on the screen 110 of the computing device 102, the user can select button prompt 420 to browse for an additional item to preview within the AR simulation. Subsequently, as shown in FIG. 11B, the AR component renders a virtual representation 1104 of another item (selected by the user). Here, the AR component refrains from indicating the collision of virtual representation 1104 with the virtual representation 1102, since virtual representation 1102 satisfies a predetermined condition (e.g., item type is a rug).

Figure 11C:
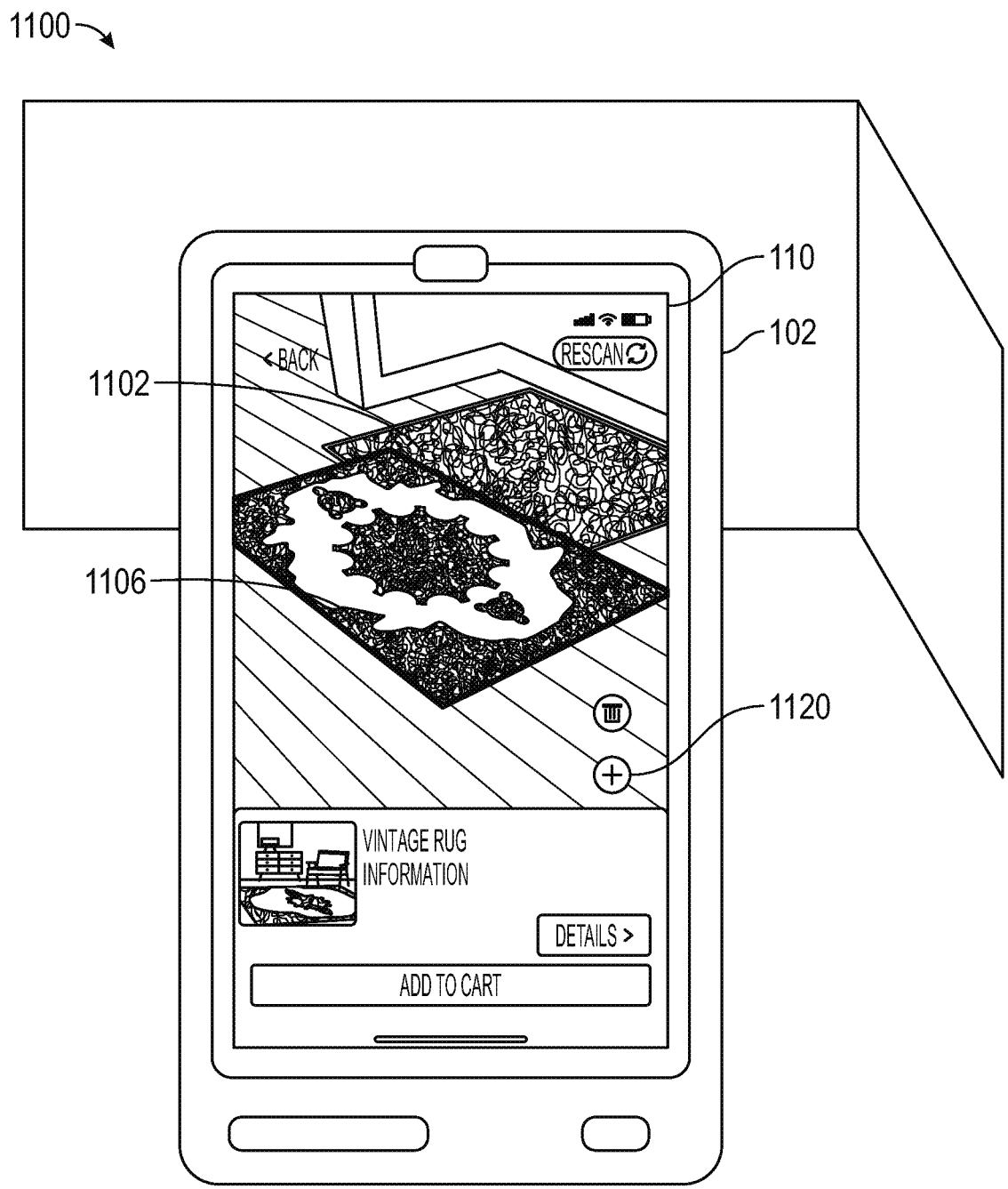
Figure 11D:
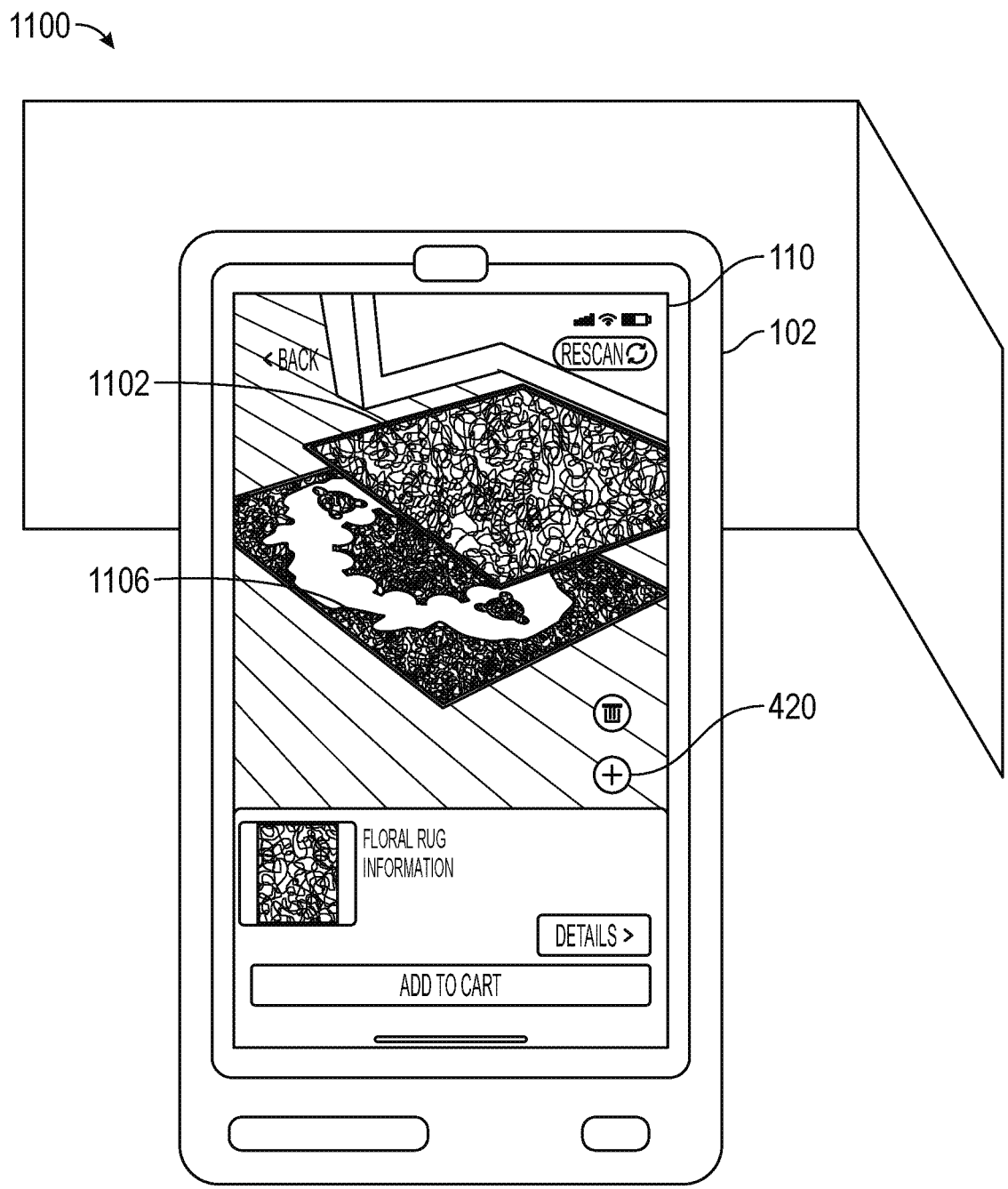

In another example shown in FIG. 11C, the AR component renders a virtual representation 1106 of another item (selected by the user). Here, the AR component also refrains from indicating the collision of virtual representation 1106 with virtual representation 1102. The AR component also renders the virtual representation 1106 on top of virtual representation 1102, since virtual representation 1106 is currently selected and also satisfies the predetermined condition (e.g., item type is a rug). As shown in FIG. 11D, at a subsequent point in time, the AR component renders the virtual representation 1102 on top of the virtual representation 1106, e.g., after detecting that virtual representation 1102 is currently selected.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., object models 258) or related data available in the cloud. For example, the application can retrieve one or more object models 258 from the cloud to use when providing an AR simulation of the item in a physical environment using the computing device 102. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:
    rendering a first virtual representation of a first item on a screen of a computing device;
    after rendering the first virtual representation, rendering a second virtual representation of a second item on the screen with the first virtual representation;
    detecting a collision between the first virtual representation and the second virtual representation on the screen;
    refraining from providing an indication of the collision to a user in response to determining that at least one of the first item or the second item satisfies a predetermined condition; and
    in response to detecting the collision and based on the predetermined condition, rendering the first virtual representation and the second virtual representation by overlaying at least a portion of the first virtual representation or the second virtual representation at the detected collision.

2. The computer-implemented method of claim 1, wherein overlaying at least the portion comprises rendering the first virtual representation on top of the second virtual representation when (i) the first virtual representation is selected and (ii) the first item and the second item satisfy the predetermined condition.

3. The computer-implemented method of claim 1, wherein overlaying at least the portion comprises rendering the second virtual representation on top of the first virtual representation when (i) the second virtual representation is selected and (ii) the first item and the second item satisfy the predetermined condition.

4. The computer-implemented method of claim 1, wherein the predetermined condition is a predefined item type.

5. The computer-implemented method of claim 1, wherein the predetermined condition is based on at least one of a size or one or more dimensions.

6. The computer-implemented method of claim 1, wherein:
    detecting the collision comprises determining that a first bounding box of the first virtual representation at least partially collides with a second bounding box of the second virtual representation on the screen; and
    the first bounding box and the second bounding box are not visible on the screen.

7. The computer-implemented method of claim 1, wherein refraining from providing the indication of the collision comprises at least one of:
    refraining from rendering at least one of a first bounding box of the first virtual representation or a second bounding box of the second virtual representation on the screen; or
    refraining from generating a haptic feedback signal on the computing device.

8. A computing device, comprising:
    a screen;
    one or more processors; and
    a memory storing instructions, which, when executed on the one or more processors perform an operation comprising:
        rendering a first virtual representation of a first item on the screen;
        after rendering the first virtual representation, rendering a second virtual representation of a second item on the screen with the first virtual representation;
        detecting a collision between the first virtual representation and the second virtual representation on the screen; and
        refraining from providing an indication of the collision to a user in response to determining that at least one of the first item or the second item satisfies a predetermined condition; and
        in response to detecting the collision and based on the predetermined condition, rendering the first virtual representation and the second virtual representation by overlaying at least a portion of the first virtual representation or the second virtual representation at the detected collision.

9. The computing device of claim 8, wherein overlaying at least the portion comprises rendering the first virtual representation on top of the second virtual representation when (i) the first virtual representation is selected and (ii) the first item and the second item satisfy the predetermined condition.

10. The computing device of claim 8, wherein overlaying at least the portion comprises rendering the second virtual representation on top of the first virtual representation when (i) the second virtual representation is selected and (ii) the first item and the second item satisfy the predetermined condition.

11. The computing device of claim 8, wherein the predetermined condition is a predefined item type.

12. The computing device of claim 8, wherein the predetermined condition is based on at least one of a size or one or more dimensions.

13. The computing device of claim 8, wherein:
- detecting the collision comprises determining that a first bounding box of the first virtual representation at least partially collides with a second bounding box of the second virtual representation on the screen; and
- the first bounding box and the second bounding box are not visible on the screen.

14. The computing device of claim 8, wherein refraining from providing the indication of the collision comprises at least one of:
- refraining from rendering at least one of a first bounding box of the first virtual representation or a second bounding box of the second virtual representation on the screen; or
- refraining from generating a haptic feedback signal on the computing device.

15. A non-transitory computer-readable storage medium having computer-executable code stored thereon, the computer-executable code being executable by one or more processors to perform an operation comprising:
- rendering a first virtual representation of a first item on a screen of a computing device;
- after rendering the first virtual representation, rendering a second virtual representation of a second item on the screen with the first virtual representation;
- detecting a collision between the first virtual representation and the second virtual representation on the screen; and
- refraining from providing an indication of the collision to a user in response to determining that at least one of the first item or the second item satisfies a predetermined condition; and
- in response to detecting the collision and based on the predetermined condition, rendering the first virtual representation and the second virtual representation by overlaying at least a portion of the first virtual representation or the second virtual representation at the detected collision.

16. The non-transitory computer-readable medium of claim 15, wherein overlaying at least the portion comprises rendering the first virtual representation on top of the second virtual representation when (i) the first virtual representation is selected and (ii) the first item and the second item satisfy the predetermined condition.

17. The non-transitory computer-readable medium of claim 15, wherein overlaying at least the portion comprises rendering the second virtual representation on top of the first virtual representation when (i) the second virtual representation is selected and (ii) the first item and the second item satisfy the predetermined condition.

18. The non-transitory computer-readable medium of claim 15, wherein the predetermined condition is a predefined item type.

19. The non-transitory computer-readable medium of claim 15, wherein the predetermined condition is based on at least one of a size or one or more dimensions.

20. The non-transitory computer-readable medium of claim 15, wherein:
- detecting the collision comprises determining that a first bounding box of the first virtual representation at least partially collides with a second bounding box of the second virtual representation on the screen; and
- the first bounding box and the second bounding box are not visible on the screen.

* * * * *